United States Patent
Raghavan et al.

(10) Patent No.: US 11,838,987 B2
(45) Date of Patent: Dec. 5, 2023

(54) AMPLITUDE CONTROL CAPABILITY INDICATION

(71) Applicant: QUALCOMM Incorporated, San Diego, CA (US)

(72) Inventors: Vasanthan Raghavan, West Windsor Township, NJ (US); Tao Luo, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/380,971

(22) Filed: Jul. 20, 2021

(65) Prior Publication Data

US 2023/0028143 A1 Jan. 26, 2023

(51) Int. Cl.
*H04W 8/24* (2009.01)
*H04W 72/044* (2023.01)
*H04W 48/14* (2009.01)

(52) U.S. Cl.
CPC ............. *H04W 8/24* (2013.01); *H04W 48/14* (2013.01); *H04W 72/0466* (2013.01); *H04W 72/0473* (2013.01)

(58) Field of Classification Search
CPC ... H04W 8/24; H04W 48/14; H04W 72/0466; H04W 72/0473
See application file for complete search history.

(56) References Cited

U.S. PATENT DOCUMENTS

| | | | |
|---|---|---|---|
| 2017/0013539 A1* | 1/2017 | Lepp | H04W 52/0229 |
| 2018/0167897 A1* | 6/2018 | Sampath | H04W 72/12 |
| 2019/0297584 A1* | 9/2019 | Stauffer | H04B 17/336 |
| 2020/0259515 A1* | 8/2020 | Mueck | H04W 4/029 |
| 2021/0022051 A1* | 1/2021 | Jia | H04L 27/2614 |
| 2021/0022083 A1* | 1/2021 | Takahashi | H04W 52/146 |
| 2021/0297959 A1* | 9/2021 | Zhou | H04W 76/28 |
| 2022/0256473 A1* | 8/2022 | Kiilerich Pratas | H04W 52/283 |

* cited by examiner

*Primary Examiner* — Ricardo H Castaneyra
(74) *Attorney, Agent, or Firm* — Holland & Hart LLP

(57) ABSTRACT

Methods, systems, and devices for wireless communications are described. A user equipment (UE) may transmit, to a base station, control signaling indicating a capability of the UE to apply an amplitude control procedure to one or more antenna elements for beamforming and indicating that the UE is applying the amplitude control procedure. The UE may receive a control message scheduling transmission of an uplink message. The UE may generate a signal including the uplink message using the amplitude control procedure, which may adjust one or more amplitudes of the signal. The UE may transmit the signal via the one or more antenna elements. In some cases, UE may indicate an amount of power loss in the signal based on the amplitude control procedure, and the base station may transmit downlink transmissions using a lower order modulation and coding scheme or an applied power boost to compensate for the power loss.

30 Claims, 16 Drawing Sheets

AMPLITUDE CONTROL CAPABILITY INDICATION

FIELD OF TECHNOLOGY

The following relates to wireless communications, including amplitude control capability indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, wireless devices (e.g., a UE and a base station) may use multiple antennas to communicate in the millimeter wave (mmW) regime. However, beamforming techniques in mmW systems could be further improved.

SUMMARY

The described techniques relate to improved methods, systems, devices, and apparatuses that support amplitude control capability indication. Generally, the described techniques provide for a user equipment (UE) and a base station to use amplitude control in addition to phase shift control in millimeter wave (mmW) systems to improve spectral efficiency and robustness. For example, to mitigate the effects of antenna blockage induced by a user, the UE may indicate to the base station, via a dynamic capability field, that the UE is capable of using amplitude control and that the UE may apply the amplitude control when sending uplink transmissions. The UE may be informed of a scheduled uplink transmission by the base station, and the UE may generate a signal including the uplink message for beamformed transmissions using the amplitude control procedure. For example, the UE may adjust one or more amplitudes of the signal at one or more of the antenna elements at the UE. The UE may transmit the generated signal via the one or more antenna elements. In some cases, the UE may signal a loss in effective isotropic radiated power (EIRP) based on applying the amplitude control procedure. To compensate for the loss in EIRP, the UE may receive an indication from the base station to use a lower order modulation and coding scheme (MCS) for the uplink transmissions, and as such, the base station may use the lower order MCS for downlink transmissions, or the base station may boost its downlink transmission power, or both.

A method for wireless communications at a UE is described. The method may include transmitting, to a base station, control signaling indicating a capability of the UE to apply an amplitude control procedure to one or more antenna elements of a set of multiple antenna elements for beamforming and indicating that the UE is applying the amplitude control procedure, receiving, from the base station, a control message scheduling transmission of an uplink message based on the control signaling, generating, by the UE using the amplitude control procedure, a signal including the uplink message for beamformed transmission via the one or more antenna elements of the set of multiple antenna elements based on the amplitude control procedure adjusting one or more amplitudes of the signal for transmission via at least one antenna element of the set of multiple antenna elements, and transmitting the signal via the set of multiple antenna elements based on the generating.

An apparatus for wireless communications at a UE is described. The apparatus may include a processor, memory coupled with the processor, and instructions stored in the memory. The instructions may be executable by the processor to cause the apparatus to transmit, to a base station, control signaling indicating a capability of the UE to apply an amplitude control procedure to one or more antenna elements of a set of multiple antenna elements for beamforming and indicating that the UE is applying the amplitude control procedure, receive, from the base station, a control message scheduling transmission of an uplink message based on the control signaling, generating, by the UE used the amplitude control procedure, a signal including the uplink message for beamformed transmission via the one or more antenna elements of the set of multiple antenna elements based on the amplitude control procedure adjusting one or more amplitudes of the signal for transmission via at least one antenna element of the set of multiple antenna elements, and transmit the signal via the set of multiple antenna elements based on the generating.

Another apparatus for wireless communications at a UE is described. The apparatus may include means for transmitting, to a base station, control signaling indicating a capability of the UE to apply an amplitude control procedure to one or more antenna elements of a set of multiple antenna elements for beamforming and indicating that the UE is applying the amplitude control procedure, means for receiving, from the base station, a control message scheduling transmission of an uplink message based on the control signaling, means for generating, by the UE using the amplitude control procedure, a signal including the uplink message for beamformed transmission via the one or more antenna elements of the set of multiple antenna elements based on the amplitude control procedure adjusting one or more amplitudes of the signal for transmission via at least one antenna element of the set of multiple antenna elements, and means for transmitting the signal via the set of multiple antenna elements based on the generating.

A non-transitory computer-readable medium storing code for wireless communications at a UE is described. The code may include instructions executable by a processor to transmit, to a base station, control signaling indicating a capability of the UE to apply an amplitude control procedure to one or more antenna elements of a set of multiple antenna elements for beamforming and indicating that the UE is applying the amplitude control procedure, receive, from the base station, a control message scheduling transmission of an uplink message based on the control signaling, generating, by the UE used the amplitude control procedure, a signal including the uplink message for beamformed transmission via the one or more antenna elements of the set of multiple antenna elements based on the amplitude control procedure adjusting one or more amplitudes of the signal for transmission via at least one antenna element of the set of multiple antenna elements, and transmit the signal via the set of multiple antenna elements based on the generating.

Some examples of the method, apparatuses, and non-transitory computer-readable medium described herein may further include operations, features, means, or instructions for transmitting the control signaling indicating an amount of loss in EIRP of the signal based on generating the signal using the amplitude control procedure.

In some examples of the method, apparatuses, and non-transitory computer-readable medium described herein, transmitting the control signaling may include operations, features, means, or instructions for transmitting the control signaling including a bit field indicating the capability.

In some examples of the method, apparatuses, and non-transitory computer-readable medium described herein, transmitting the control signaling may include operations, features, means, or instructions for transmitting the control signaling indicating a quantization amplitude adjustment level applied by the amplitude control procedure.

In some examples of the method, apparatuses, and non-transitory computer-readable medium described herein, transmitting the control signaling may include operations, features, means, or instructions for transmitting the control signaling indicating a quantization amplitude adjustment range applied by the amplitude control procedure.

In some examples of the method, apparatuses, and non-transitory computer-readable medium described herein, transmitting the control signaling may include operations, features, means, or instructions for transmitting the control signaling indicating which of uniform or non-uniform quantization amplitude adjustment may be applied by the amplitude control procedure.

In some examples of the method, apparatuses, and non-transitory computer-readable medium described herein, transmitting the control signaling may include operations, features, means, or instructions for transmitting control signaling indicating that the capability may be a semi-persistent capability indicating that the amplitude control procedure may be being applied for a defined time period.

In some examples of the method, apparatuses, and non-transitory computer-readable medium described herein, transmitting the control signaling may include operations, features, means, or instructions for transmitting the control signaling including a request for the base station to apply a first MCS of a set of multiple available MCSs for downlink transmission based on the control signaling indicating that the UE may be applying the amplitude control procedure.

In some examples of the method, apparatuses, and non-transitory computer-readable medium described herein, transmitting the control signaling may include operations, features, means, or instructions for transmitting the control signaling including a request for the base station to apply a power boost for one or more downlink transmissions based on the control signaling indicating that the UE may be applying the amplitude control procedure.

A method for wireless communications at a base station is described. The method may include receiving, from a UE, control signaling indicating a capability of the UE to apply an amplitude control procedure to one or more antenna elements of a set of multiple antenna elements for beamforming and indicating that the UE is applying the amplitude control procedure, transmitting, to the UE, a control message scheduling transmission of an uplink message, and monitoring for a signal including the uplink message based on the control signaling and the control message.

An apparatus for wireless communications at a base station is described. The apparatus may include a processor, memory coupled with the processor, and instructions stored in the memory. The instructions may be executable by the processor to cause the apparatus to receive, from a UE, control signaling indicating a capability of the UE to apply an amplitude control procedure to one or more antenna elements of a set of multiple antenna elements for beamforming and indicating that the UE is applying the amplitude control procedure, transmit, to the UE, a control message scheduling transmission of an uplink message, and monitor for a signal including the uplink message based on the control signaling and the control message.

Another apparatus for wireless communications at a base station is described. The apparatus may include means for receiving, from a UE, control signaling indicating a capability of the UE to apply an amplitude control procedure to one or more antenna elements of a set of multiple antenna elements for beamforming and indicating that the UE is applying the amplitude control procedure, means for transmitting, to the UE, a control message scheduling transmission of an uplink message, and means for monitoring for a signal including the uplink message based on the control signaling and the control message.

A non-transitory computer-readable medium storing code for wireless communications at a base station is described. The code may include instructions executable by a processor to receive, from a UE, control signaling indicating a capability of the UE to apply an amplitude control procedure to one or more antenna elements of a set of multiple antenna elements for beamforming and indicating that the UE is applying the amplitude control procedure, transmit, to the UE, a control message scheduling transmission of an uplink message, and monitor for a signal including the uplink message based on the control signaling and the control message.

Some examples of the method, apparatuses, and non-transitory computer-readable medium described herein may further include operations, features, means, or instructions for receiving the control signaling indicating an amount of loss in EIRP of the signal based on the control signaling indicating that the UE may be applying the amplitude control procedure, transmitting, to the UE, the control message including an indication to use a lower order MCS for transmitting the uplink message as compared to a second MCS used during transmission of a prior uplink message based on the indicated amount of loss, and transmitting, to the UE, one or more downlink transmissions using the lower order MCS or with an applied power boost based on the indicated amount of loss.

Some examples of the method, apparatuses, and non-transitory computer-readable medium described herein may further include operations, features, means, or instructions for receiving the control signaling indicating an amount of loss in EIRP of the signal based on the control signaling indicating that the UE may be applying the amplitude control procedure and transmitting, to the UE, one or more downlink transmissions with an applied power boost based on the indicated amount of loss.

In some examples of the method, apparatuses, and non-transitory computer-readable medium described herein, receiving the control signaling may include operations, features, means, or instructions for receiving the control signaling including a bit field indicating the capability.

In some examples of the method, apparatuses, and non-transitory computer-readable medium described herein, receiving the control signaling may include operations, features, means, or instructions for receiving the control signaling indicating a quantization amplitude adjustment level applied by the amplitude control procedure.

In some examples of the method, apparatuses, and non-transitory computer-readable medium described herein, receiving the control signaling may include operations, features, means, or instructions for receiving the control signaling indicating a quantization amplitude adjustment range applied by the amplitude control procedure.

In some examples of the method, apparatuses, and non-transitory computer-readable medium described herein, receiving the control signaling may include operations, features, means, or instructions for receiving the control signaling indicating which of uniform or non-uniform quantization amplitude adjustment may be applied by the amplitude control procedure.

In some examples of the method, apparatuses, and non-transitory computer-readable medium described herein, receiving the control signaling may include operations, features, means, or instructions for receiving the control signaling indicating that the capability may be a semi-persistent capability indicating that the amplitude control procedure may be being applied for a defined time period.

In some examples of the method, apparatuses, and non-transitory computer-readable medium described herein, receiving the control signaling may include operations, features, means, or instructions for receiving the control signaling including a request for the base station to use a first MCS of a set of multiple available MCSs for downlink transmission and transmitting a downlink message to the UE in accordance with the first MCS.

Some examples of the method, apparatuses, and non-transitory computer-readable medium described herein may further include operations, features, means, or instructions for selecting a subset of available MCSs for decoding a resource allocated for the uplink message based on the control signaling indicating that the UE may be applying the amplitude control procedure.

In some examples of the method, apparatuses, and non-transitory computer-readable medium described herein, receiving the control signaling may include operations, features, means, or instructions for receiving the control signaling including a request for the base station to apply a power boost for downlink transmission based on the control signaling indicating that the UE may be applying the amplitude control procedure and transmitting a downlink message to the UE with an applied power boost based on the control signaling.

DETAILED DESCRIPTION

Figure 1:
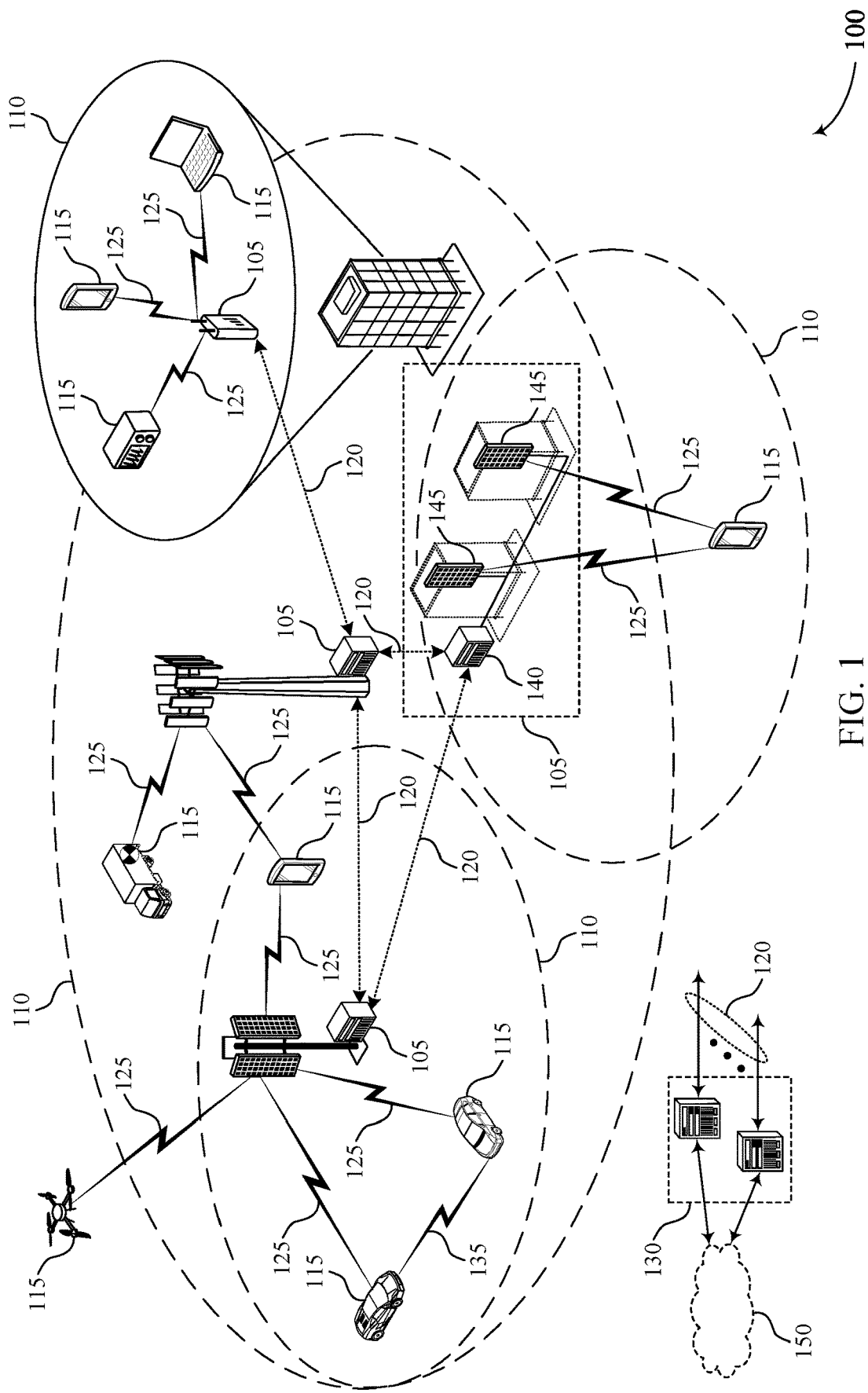
FIG. 1 illustrates an example of a wireless communications system that supports amplitude control capability indication in accordance with aspects of the present disclosure.

A user equipment (UE) and a base station may use multiple antennas to communicate in millimeter wave (mmW) systems. For example, the UE and the base station may use mmW beamforming. In some cases, the UE and the base station may both control the phase shift of each antenna element in a beamformed signal to maintain an effective isotropic radiated power (EIRP) for uplink transmissions. However, there may be cases in which amplitude control may be combined with phase shift control to improve spectral efficiency and robustness in mmW beamforming beyond cases using phase shift control independently. For example, one or more antenna elements of the UE may be blocked by a user's hand or body, which may lead to unequal amplitudes received at or transmitted across the blocked antenna elements as compared to unblocked antenna elements.

Techniques described herein enable a UE and a base station to use amplitude control in addition to phase shift control in mmW systems to improve spectral efficiency and robustness. For example, to mitigate the effects of antenna blockage induced by a user, the UE may indicate to the base station, via a dynamic capability field, that the UE is capable of using amplitude control and that the UE may apply the amplitude control when sending uplink transmissions. The UE may be informed of a scheduled uplink transmission by the base station, and the UE may generate a signal including the uplink message for beamformed transmission using the amplitude control procedure. For example, the UE may adjust one or more amplitudes of the signal at one or more of the antenna elements at the UE. The UE may transmit the generated signal via the one or more antenna elements. In some cases, the UE may signal a loss in EIRP for uplink transmissions based on applying the amplitude control procedure. To compensate for the loss in EIRP, the UE may receive an indication from the base station to use a lower order modulation and coding scheme (MCS) for the uplink transmissions, and as such, the base station may use the lower order MCS for downlink transmissions, or the base station may boost its downlink transmission power, or both.

Particular aspects of the subject matter described herein may be implemented to realize one or more advantages. The described techniques may support improvements in amplitude control in mmW systems by reducing power consumption and reducing latency at the UE. Further, in some cases, the techniques described herein may mitigate interference and improve spectral efficiency and robustness. As such, supported techniques may include improved network operations, and, in some examples, may promote network efficiencies, among other benefits.

Aspects of the disclosure are initially described in the context of wireless communications systems. Aspects of the disclosure are then described in the context of an amplitude control scheme and a process flow. Aspects of the disclosure are further illustrated by and described with reference to apparatus diagrams, system diagrams, and flowcharts that relate to amplitude control capability indication.

FIG. 1 illustrates an example of a wireless communications system 100 that supports amplitude control capability indication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency (RF) spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency and robustness by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF or analog beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a synchronization signal block (SSB)-based reference signal), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Some wireless communications systems 100 (e.g., 5G cellular systems, 5G NR systems) may be configured to support one or more frequency ranges. The one or more frequency ranges may include frequency range one (FR1), frequency range two (FR2), and frequency range four (FR4). FR1 may include frequencies 410 MHz to 7125 MHz, FR2 may include frequencies 24.45 GHz to 52.6 GHz, and FR4 may include frequencies from 52.6 GHz to 114.25 GHz. The FR1 range may be referred to as sub-6 (e.g., includes sub-6 GHz frequency bands). In some cases, FR1 may overlap with LTE cellular frequencies (e.g., 700 MHz to 2700 MHz). The FR2 and FR4 ranges may be referred to as mmW frequencies.

In some examples, a UE 115 and a base station 105 may use amplitude control in addition to phase shift control in mmW systems to improve spectral efficiency and robustness. For example, to mitigate the effects of antenna blockage induced by a user, the UE 115 may indicate to the base station 105, via a dynamic capability field, that the UE 115 is capable of using amplitude control and that the UE 115 may apply the amplitude control when sending uplink transmissions. The UE 115 may be informed of a scheduled uplink transmission by the base station, and the UE 115 may generate a signal including the uplink message for beamformed transmission using the amplitude control procedure. For example, the UE 115 may adjust one or more amplitudes of the signal at one or more of the antenna elements at the UE 115. The UE 115 may transmit the generated signal via the one or more antenna elements. In some cases, the UE 115 may signal a loss in EIRP based on applying the amplitude control procedure. To compensate for the loss in EIRP, the UE 115 may receive an indication from the base station 105 to use a lower order MCS for the uplink transmissions, and as such, the base station 105 may use the lower order MCS for downlink transmissions, or the base station 105 may boost its downlink transmission power, or both.

Figure 2:
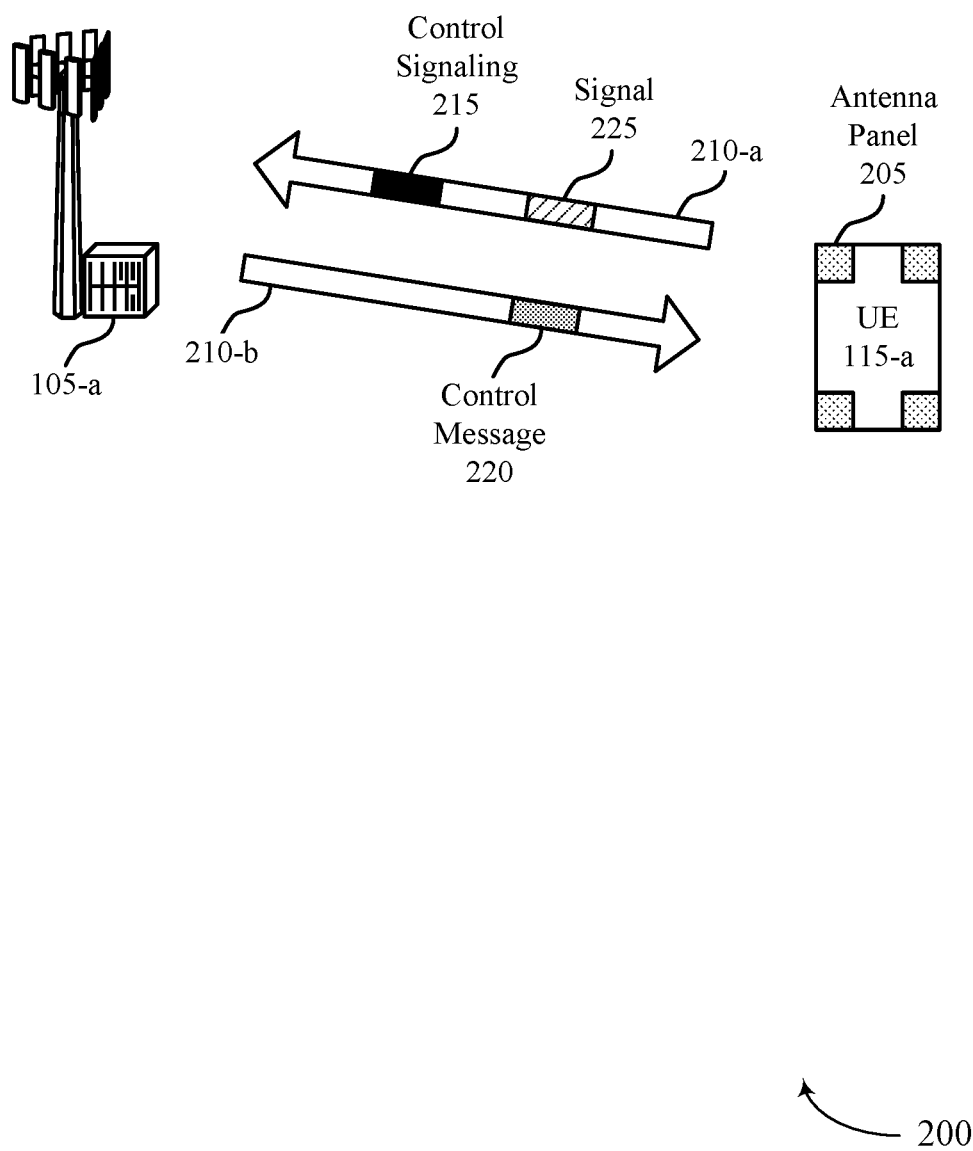
FIG. 2 illustrates an example of a wireless communications system that supports amplitude control capability indication in accordance with aspects of the present disclosure.

FIG. 2 illustrates an example of a wireless communications system 200 that supports amplitude control capability indication in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-*a* and a base station 105-*a*, which may be examples of corresponding devices described herein with reference to FIG. 1. The wireless communications system 200 may include features for improved communications between the UE 115-*a* and the base station 105-*a*, among other benefits.

The UE 115-*a* and the base station 105-*a* may use multiple antennas to communicate in mmW systems. For example, the UE 115-*a* may include one or more antenna panels 205, and each antenna panel 205 may include a quantity of antenna elements (e.g., 4 to 6). The UE 115-*a* may transmit uplink transmissions to the base station 105-*a* using the antenna panel 205 via a communications link 210-*a*, and the UE 115-*a* may receive downlink transmissions from the base station 105-*a* using the antenna panel 205 via a communications link 210-*b*. In some cases, the UE 115-*a* and the base station 105-*a* may communicate using mmW beamforming from multiple antennas, which may bridge a link budget for the devices due to an array gain. In some examples, the UE 115-*a* and the base station 105-*a* may use codebook-based beamforming (e.g., directional beamforming), where a codebook of directional beams may include one or more sets of beam weights, and where each set of beam weights may steer energy in a particular direction. Due to memory and complexity constraints, the UE 115-*a* and the base station 105-*a* may each store a fixed codebook in radio-frequency integrated circuit (RFIC) memory, and the UE 115-*a* and the base station 105-*a* may perform beam training over the fixed codebook (e.g., hierarchical beam training via P-1, P-2, and P-3 procedures).

In some examples, mmW beamforming at both the UE 115-*a* and the base station 105-*a* may include phase shift control. For example, the UE 115-*a* and the base station 105-*a* may shift the phase of a signal received at a particular antenna element to improve the energy output across all antenna elements of the antenna panel 205. The phase shift control procedure is described in more detail with reference to FIG. 3. In some cases, the UE 115-*a* and the base station 105-*a* may benefit from using amplitude control in addition to phase shift control even if it may cause an EIRP loss in uplink transmissions. For example, in using amplitude control, the UE 115-*a* and the base station 105-*a* may adapt the amplitude of a signal across different antenna elements (e.g., to mimic maximum ratio combining), which may cause some gain in a scenario in which the antenna elements receive signals with different amplitudes. In some cases, using an equal amplitude for each antenna element may be beneficial if the signals received at each of the antenna elements are compatible (e.g., the same) in terms of signal strength. However, in some cases, one antenna element may receive a signal that may differ from signals received by other antenna elements. In some examples, the UE 115-*a* and the base station 105-*a* may use amplitude control, for example by increasing a rate corresponding to an antenna element that may have received a stronger signal and decreasing a rate corresponding to an antenna element that may have received a weaker signal. The UE 115-*a* and the base station 105-*a* may use amplitude control to maximize an SNR when a disparate set of signals with different amplitudes are received across different antenna elements. However, the UE 115-*a* and the base station 105-*a* may refrain from using amplitude control if downlink and uplink reciprocity and peak EIRP are considered. Additionally or alternatively, using an equal amplitude may decrease performance (e.g., by 2 dB or more) based on the level of disparity in signal amplitudes across antenna elements.

The UE 115-*a* and the base station 105-*a* may use amplitude control in the downlink because of hand blockage. For example, a user's hand, a user's body, or both may block an antenna element of the UE 115-*a* (e.g., the user's hand may be near or on top of the antenna panel 205), which may create unequal signal amplitudes across the blocked antenna array. In some cases, indentations in the user's hand may be comparable in path distance to the wavelength of transmission (e.g., within a margin of a few millimeters), which may cause areas of constructive interference or destructive interference between the signal and different parts of the user's hand or fingers. Which antenna element of the antenna panel 205 may receive more or less gains may depend on the user's hand orientation, the user's hand grip, how many of the user's fingers may be blocking the signal, the user's hand properties (e.g., size, dielectric properties), and the like. For example, the user's hand properties may cause random constructive and destructive interference with the signal. In some cases, the user's hand being near the antenna elements may cause multiple reflections off the hand surface, which may create phase and amplitude distortions in the signal. The signal power at the antenna elements may further depend on the number of antenna elements (e.g., including module size, geometry), an angle of interest, and the like. In some cases, hand blockage may be mitigated by the use of adaptive or dynamic beam weights that may either search over a phase space alone or over a phase space and an amplitude space. In some cases, using amplitude control may also lead to improved performance over a phase search independently.

In some cases, for example, a user's finger may be on the order of 1 cm, and the user's finger may completely envelope an antenna panel 205 operating at 30 GHz (e.g., a wavelength of 10 mm). The antenna panel 205 may include antenna elements separated by 5 mm (e.g., $\lambda/2$ at 30 GHz). If there is a four by one antenna array and the user is blocking the antenna panel 205 with two fingers, the user may completely block the radiation coming from the four by one antenna array. If the user blocks the antenna panel 205 with one finger which matches the antenna element orientation, two of the four antenna elements may be blocked and may receive poor signal strength while the other two antenna elements may be unblocked and may receive strong signal strength. If the user's fingers partially block one or more of the four antenna elements, the antenna elements may receive a combination of varying random signal strengths.

Amplitude control may improve the signal strength across the antenna panel 205 and mitigate the effects of user hand blockage. For example, using phase shift control (e.g., a 3-bit phase shifter) may improve spectral efficiency by 7% over the use of a static codebook, and using phase shift control and amplitude control may improve the spectral efficiency by 12% or more (e.g., a 1 dB to 2 dB improvement). That is, the UE 115-*a* and the base station 105-*a* may experience a performance improvement in spectral efficiency with phase shift adaptive beam weights and a phase shifter and amplitude control-based beam weights over a static or directional beam codebook, and phase control and amplitude control together may lead to more significant gains over phase control alone relative to a static or directional beam codebook. In some cases, amplitude control may be used for improved pseudo-omni beam construction (e.g., for initial link acquisition), where the improvement may be in terms of the flatness of the structure of a beam pattern over the intended coverage area of the beam, adaptive beam weight design for non-blockage scenarios, and interference mitigation via beam weight tapering, among other use cases.

Independent of what use-case may motivate the use of amplitude control, the UE 115-*a* and the base station 105-*a* may indicate the use of amplitude control at the UE 115-*a* or the base station 105-*a* to the device at the other end of the link. For example, the UE 115-*a* may transmit, to the base station 105-*a* and via the communications link 210-*a*, control signaling 215 indicating the capability of the UE to apply an amplitude control procedure to one or more antenna elements of the antenna panel 205. The control signaling 215 may also indicate that the UE 115-*a* is applying the amplitude control procedure. In some cases, the indication may be in a dynamic capability field. For example, the indication may indicate the use of amplitude control for a short period of time when the UE 115-*a* may experience hand blockage. In some cases, the capability may be configured semi-statically or may be configured for a particular time period. The dynamic capability field may be a one-bit field where 1 may represent that the UE 115-*a* may be using amplitude control (e.g., amplitude control is done) and 0 may represent that the UE 115-*a* may be refraining from using amplitude control (e.g., amplitude control is not done). That is, the capability indication may be a binary field that may correspond to the presence or absence of amplitude control.

In some cases, the UE 115-*a* may receive, from the base station 105-*a* and via the communications link 210-*b*, a control message 220 scheduling the transmission of an uplink message based on the capability of the UE 115-*a* to use the amplitude control procedure. The UE 115-*a* may generate a signal 225 using the amplitude control procedure for transmissions via the one or more antenna elements of the antenna panel 205, where the signal may include the uplink message for mmW beamforming. In some cases, the UE 115-*a* may use the amplitude control procedure to adjust one or more amplitudes of the signal 225 for transmission via the antenna elements, for example, if there is hand blockage. The UE 115-*a* may then transmit the signal 225 to the base station 105-*a* and via the communications link 210-*a*.

In some cases, the UE 115-*a* may use more granularity in the capability indication in the control signaling 215 to convey quantization steps of the amplitude control (e.g., a quantization associated with the amplitude adjustment). For example, the quantization steps may quantify how many dB the amplitude is adjusted from a prior amplification level. In some cases, the UE 115-*a* may indicate the range of amplitude quantization (e.g., an amplitude adjustment range), which may indicate a range of dB over which the amplitude may be adjusted. For example, the UE 115-*a* may indicate that the amplitude may be adjusted by 0.1 dB per adjustment, and that the UE 115-*a* may perform the 0.1 dB adjustment for a range of 0.1 dB to 1 dB. In some cases, the steps in the amplitude quantization may be uniform or non-uniform. For example, the capability indication may include a 5-bit amplitude control which may go from a 0 dBm peak, to −0.1, to −0.2, to −0.3, and so on in uniform levels of amplitude adjustment (e.g., equal quantization steps), of from a 0 dBm peak, to −0.25 dB, to −0.3 dB, and so on in non-uniform levels of amplitude (e.g., non-equal quantization steps). In some cases, the 1-bit field may be extended to a multi-bit field to detail the steps of amplitude control. The amplitude quantization may be implemented by (e.g., configured by) the UE 115-*a*.

The UE 115-*a* may inform the base station 105-*a* of the amplitude quantization (e.g., on the downlink and the uplink) which may assist in base station 105-*a* operations. For example, using amplitude control may lead to a loss in EIRP for uplink transmissions (e.g., due to power backoff and maximum power reduction (MPR) due to power amplifiers (PAs) failing to operate at peak ratings in a linear regime of operation). In some cases, the UE 115-*a* may transmit control signaling to the base station 105-*a* indicating an amount of loss in EIRP of the signal based on the UE 115-*a* applying the amplitude control procedure. Because of the loss in EIRP, the base station 105-*a* may transmit a control message indicating for the UE 115-*a* to use a lower order MCS for transmitting the uplink message as compared to an MCS used for transmitting a prior uplink message. In some cases, the base station 105-*a* may transmit one or more downlink transmissions to the UE 115-*a* using the lower order MCS, with an applied power boost, or both, based on the loss in EIRP and to match the MCS used for the downlink transmissions with the MCS used for uplink transmissions (e.g., in the case of beam correspondence, reciprocity, or both). In some examples, the base station 105-*a* may select a subset of available MCSs for decoding a resource allocated for the uplink message based on the UE 115-*a* applying the amplitude control procedure. For example, the base station 105-*a* may infer that the UE is not using one or more higher order MCSs, and thus may skip attempting to decode an uplink channel using the one or more higher order MCSs in which the UE 115-*a* is scheduled to transmit an uplink transmission. Instead, the base station 105-*a* may use one or more relatively lower order MCSs when attempting to decode an uplink transmission. Additionally or alternatively, the UE 115-*a* may indicate to the base station 105-*a* to perform a power boost on downlink transmissions to meet the same link budget (e.g., to compensate for the lower EIRP) as in the case without amplitude control.

In some cases, the process of the UE 115-*a* and the base station 105-*a* switching from using phase shift control to using amplitude control and phase shift control (e.g., via the capability field update) may be met with an X dB power boost on the downlink automatically without using a power control loop, where the value of X may be configured by the base station 105-*a* or based on a suggestion or recommendation from the UE 115-*a* to the base station 105-*a*. In some examples, skipping the power control loop-based update may save power and reduce latency in the wireless communications system 200. In some cases, the UE 115-*a* using amplitude control may result in the UE 115-*a* reducing the power level across one or more antenna elements of the antenna panel 205 to improve overall spectral efficiency and robustness. In some cases, the base station 105-*a* may reduce the MCS for downlink transmissions or may use a power boost on downlink transmissions to account for uplink transmission and downlink transmission reciprocity (e.g., to match the EIRP loss of the uplink transmission in downlink transmissions).

Figure 3:
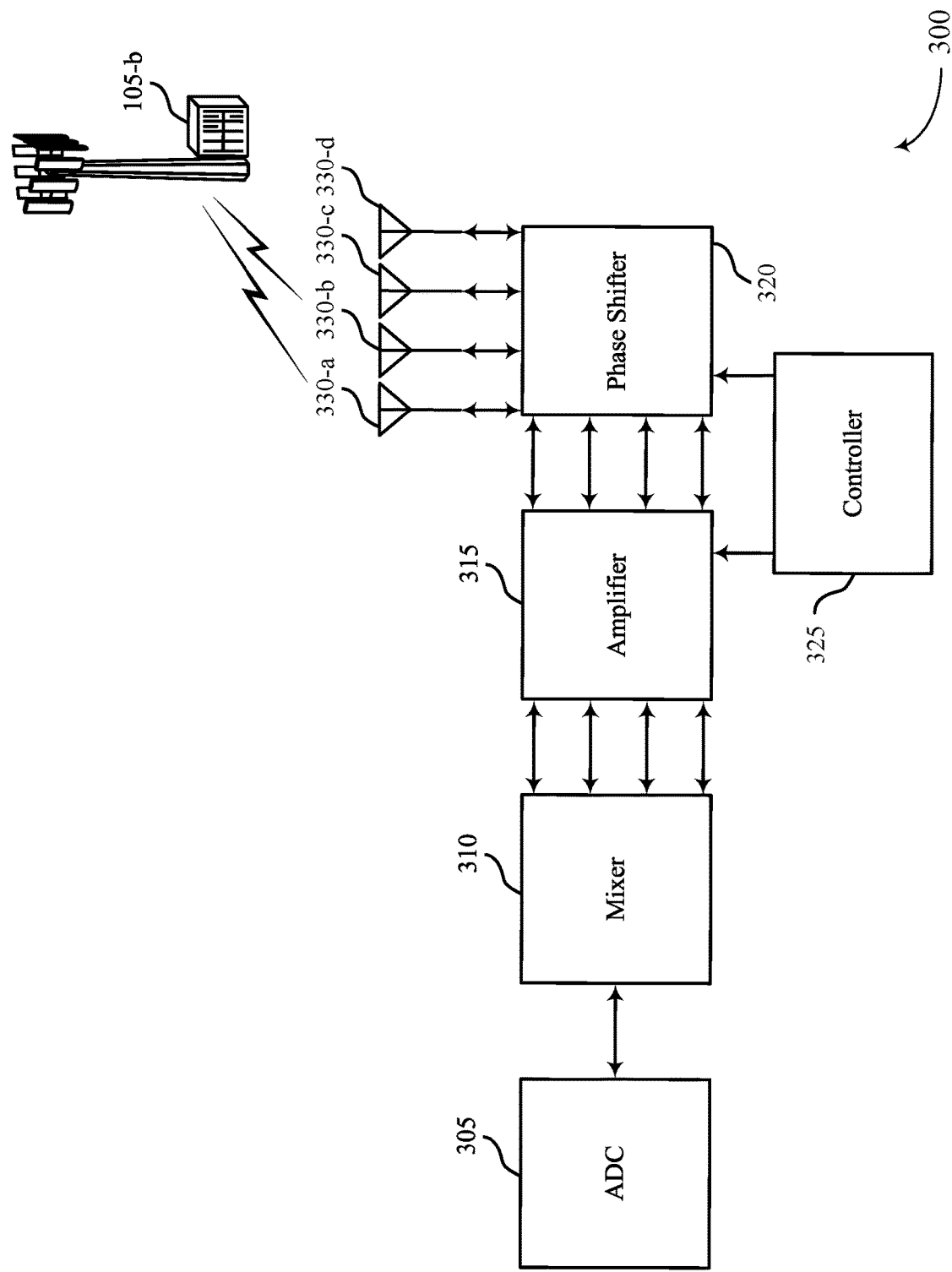
FIG. 3 illustrates an example of an amplitude control scheme that supports amplitude control capability indication in accordance with aspects of the present disclosure.

FIG. 3 illustrates an example of a amplitude control scheme 300 that supports amplitude control capability indication in accordance with aspects of the present disclosure. In some examples, the amplitude control scheme 300 may implement aspects of the wireless communications systems 100 and 200 or may be implemented by aspects of the wireless communications systems 100 and 200. For example, the amplitude control scheme 300 may be implemented by a UE, which may be an example of corresponding devices described herein with reference to FIGS. 1 and 2.

In some cases, a UE and a base station may use multiple antennas to communicate in mmW beamforming systems. The UE and the base station may use amplitude control in addition to phase shift control to improve spectral efficiency and robustness of signals received at the multiple antennas. For example, to mitigate the effects of antenna blockage induced by a user's hand, the UE may indicate to the base station that that the UE is capable of using an amplitude control procedure and that the UE may apply the amplitude control procedure when sending uplink transmissions. In some cases, the UE may be informed of a scheduled uplink transmission, and the UE may generate a signal including an uplink message for beamformed transmission using the amplitude control procedure. For example, the UE may adjust one or more amplitudes of the signal at one or more antenna elements of an antenna panel at the UE. The UE may transmit the signal via the one or more antenna elements. In some cases, the UE may signal a loss in EIRP for uplink transmissions based on applying the amplitude control procedure. To compensate for the loss in EIRP, the UE may receive an indication from the base station to use a lower order MCS for the uplink transmissions, and as such the base station may use the lower order MCS for downlink transmissions, or the base station may boost its downlink transmission power, or both.

As described herein, the UE and the base station may use phase shift control, amplitude control, or both for mmW beamforming. In the uplink direction, for example, the UE may modulate a number of bits to be sent in an uplink transmission to generate a signal at base band. The signal may be processed through an analog-to-digital converter (ADC) 305 and a mixer 310, which may convert the signal from base band to an intermediate frequency (IF) or radio frequency depending on the system architecture. The signal may be mapped for transmission via a respective antenna element 330 of an antenna panel and may follow a respective path through the amplifier 315 (e.g., a fixed gain or variable gain amplifier) and phase shifter 320. In some cases, the respective signals may reach a power amplifier (e.g., one or more power amplifiers (PAs)) that may apply a respective amount of power amplification for each signal to be output from a respective antenna element 330-*a*, 330-*b*, 330-*c*, and 330-*d*. For example, controller 325 may apply an amplitude control procedure to adjust an amount of power amplification applied to a respective signal to be output from a respective antenna element 330-*a*, 330-*b*, 330-*c*, and 330-*d*, due to, for example, blockage experienced by one or more of the antenna elements. The amplified signals may then be input to a phase shifter 320 for uplink transmissions. The phase shifter 320 may apply a respective amount of phase to each signal to be output from a respective antenna element 330-*a*, 330-*b*, 330-*c*, and 330-*d*. For example, controller 325 may adjust an amount of phase applied to a respective signal to be output from a respective antenna element 330-*a*, 330-*b*, 330-*c*, and 330-*d*, for beamforming of the joint signal radiating from the antenna elements 330 in a particular direction. In some cases, the UE may transmit the amplified, phase shifted signals to the base station 105-*b* via the antenna elements 330-*a*, 330-*b*, 330-*c*, and 330-*d*.

In some cases, in the downlink direction, the UE may receive a signal from the base station 105-*b* at the antenna elements 330 of the antenna panel of the UE. For example, the antenna panel of the UE may include four antenna elements 330 (e.g., in a four by one antenna array), including the antenna element 330-*a*, the antenna element 330-*b*, an antenna element 330-*c*, and an antenna element 330-*d*, and the UE may receive signals via the antenna elements 330-*a*, 330-*b*, 330-*c*, and 330-*d*. Each signal received at a respective antenna element 330 may be processed through the phase shifter 320, where the signal may be phase shifted depending on a receive beam applied by the controller 325. The controller 325 may introduce a respective amount of phase by phase shifter 320 for a respective signal received at a respective antenna element.

The signal may then be output to the amplifier 315 (e.g., a low-noise amplifier) which may apply the amplitude control procedure. For example, the controller 325 may cause the amplifier 315 to adjust the amplitude of one or more of the signals received at a respective one of antenna elements 330 based on whether the antenna elements may be at least partially blocked (e.g., by a user's hand, a user's body, or a combination thereof). In some cases, each signal received at a particular antenna element 330 may receive individual amplification and phase shifting depending on the received signal power and phase. In some cases, the UE may combine the energy of each received signal across the antenna elements 330 to demodulate and decode the signal. In some examples, the signals corresponding to each antenna element 330 may receive different amplification and phase shifting to increase spectral efficiency and robustness across all of the antenna elements 330.

Figure 4:
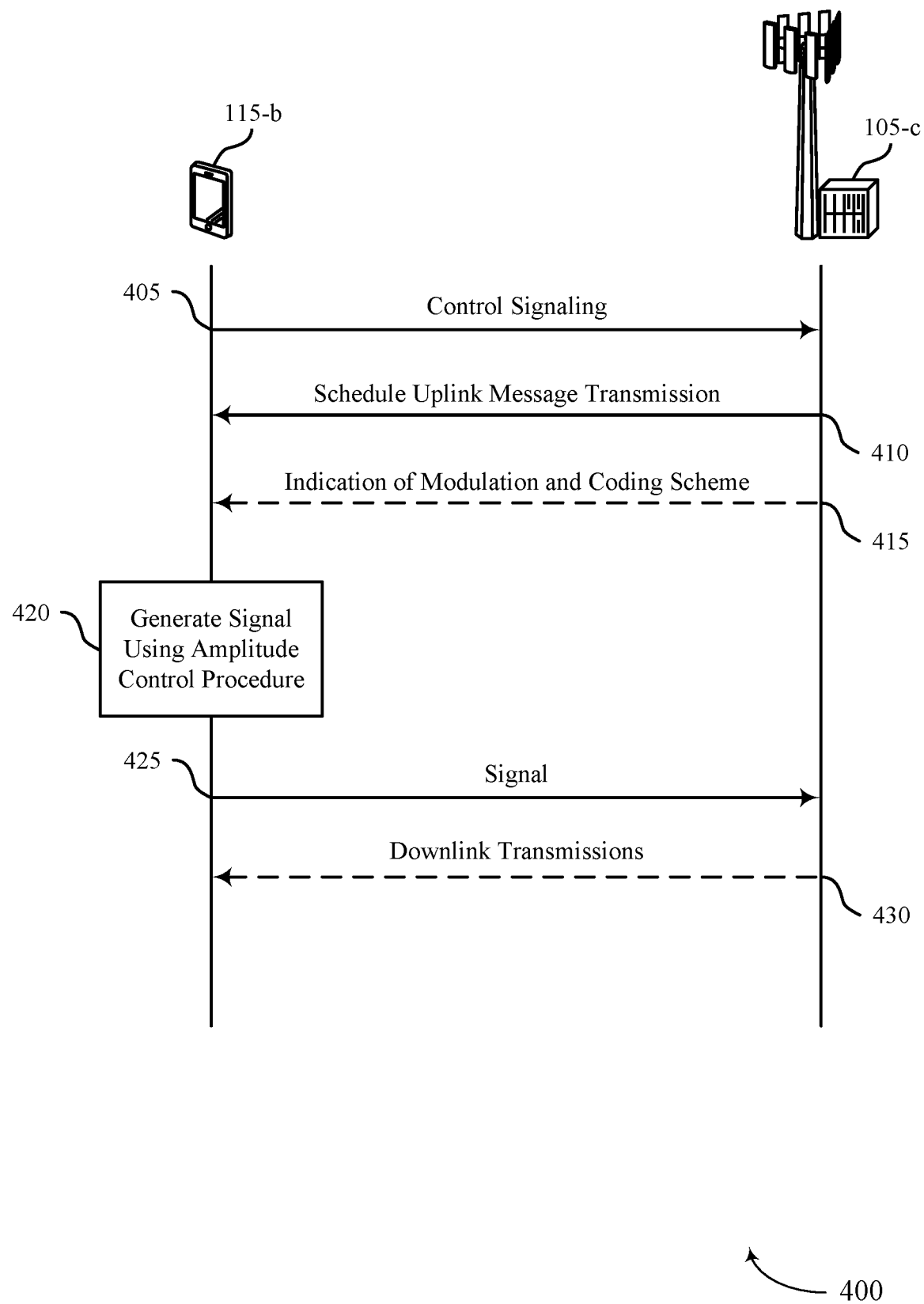
FIG. 4 illustrates an example of a process flow that supports amplitude control capability indication in accordance with aspects of the present disclosure.

FIG. 4 illustrates an example of a process flow 400 that supports amplitude control capability indication in accordance with aspects of the present disclosure. The process flow 400 may implement aspects of wireless communications systems 100 and 200, or may be implemented by aspects of the wireless communications system 100 and 200. For example, the process flow 400 may illustrate operations between a UE 115-*b* and a base station 105-*c*, which may be examples of corresponding devices described with reference to FIGS. 1 and 2. In the following description of the process flow 400, the operations between the UE 115-*b* and the base station 105-*c* may be transmitted in a different order than the example order shown, or the operations performed by the UE 115-*b* and the base station 105-*c* may be performed in different orders or at different times. Some operations may also be omitted from the process flow 400, and other operations may be added to the process flow 400.

At 405, the UE 115-*b* may transmit, to the base station 105-*c*, control signaling indicating a capability of the UE 115-*b* to apply an amplitude control procedure to one or more antenna elements for mmW beamforming. The control signaling may also indicate that the UE 115-*b* is applying the amplitude control procedure (e.g., to an uplink transmission). In some cases, the capability indication may be a dynamic 1-bit capability field that may indicate the presence or absence of the amplitude control procedure. In some cases, the UE 115-*b* may apply the amplitude control procedure based on the one or more antenna elements being partially or fully blocked (e.g., by hand blockage). In some cases, the control signaling may indicate an amount of EIRP loss resulting from the UE 115-*b* applying the amplitude control procedure when generating an uplink transmission. In some cases, the UE 115-*b* may transmit the control signaling comprising a request for the base station 105-*c* to use a first MCS of a plurality of available MCSs. For example, the UE 115-*b* may request that the base station 105-*c* permit the UE 115-*b* to use a lower order MCS for a subsequent uplink transmission due to the UE 115-*b* applying the amplitude control procedure.

At 410, the UE 115-*b* may receive, from the base station 105-*c*, a control message scheduling the transmission of an uplink message based on the control signaling. In some examples, at 415, the UE 115-*b* may receive, from the base station 105-*c*, in the same control message received at a 410 or in a different control message, a control message including an indication to use a lower order MCS for transmitting the uplink message as compared to a second MCS used during the transmission of a prior uplink message based on the indicated amount of EIRP loss. Additionally or alternatively, the base station 105-*c* may select a subset of available MCSs (e.g., select a lower order MCS and avoid attempting to decode using a higher order MCS) for decoding a resource allocated for the uplink message based on the control signaling indicating that the UE 115-*b* is applying the amplitude control procedure.

At 420, the UE 115-*b* may generate a signal including the uplink message using the amplitude control procedure for beamformed transmission via the one or more antenna elements. In some cases, the amplitude control procedure may adjust one or more amplitudes of the signal for transmission via the at least one of the antenna elements.

At 425, the UE 115-*b* may transmit the signal, to the base station 105-*c*, via the one or more antenna elements based on generating the signal using the amplitude control procedure. In some cases, the amplitude control may lead to a loss in EIRP for the uplink transmission, which the UE 115-*b* may indicate to the base station 105-*c* in the control signaling.

At 430, the UE 115-*b* may receive, from the base station 105-*c* one or more downlink transmissions, where the base station 105-*c* may transmit the one or more downlink transmissions using the lower order MCS, with an applied power boost, or both based on the indicated amount of EIRP loss. For example, in cases with uplink transmission and downlink transmission reciprocity, the base station 105-*c* may apply the lower order MCS or a power boost to downlink transmissions to match the lower EIRP in the uplink transmissions due to the amplitude control procedure. In some examples, the base station 105-*c* may transmit a grant scheduling the downlink transmission prior to 425, where the grant may indicate a lower order MCS, and the UE 115-*b* may use the lower order MCS when generating its signal at 420.

Figure 5:
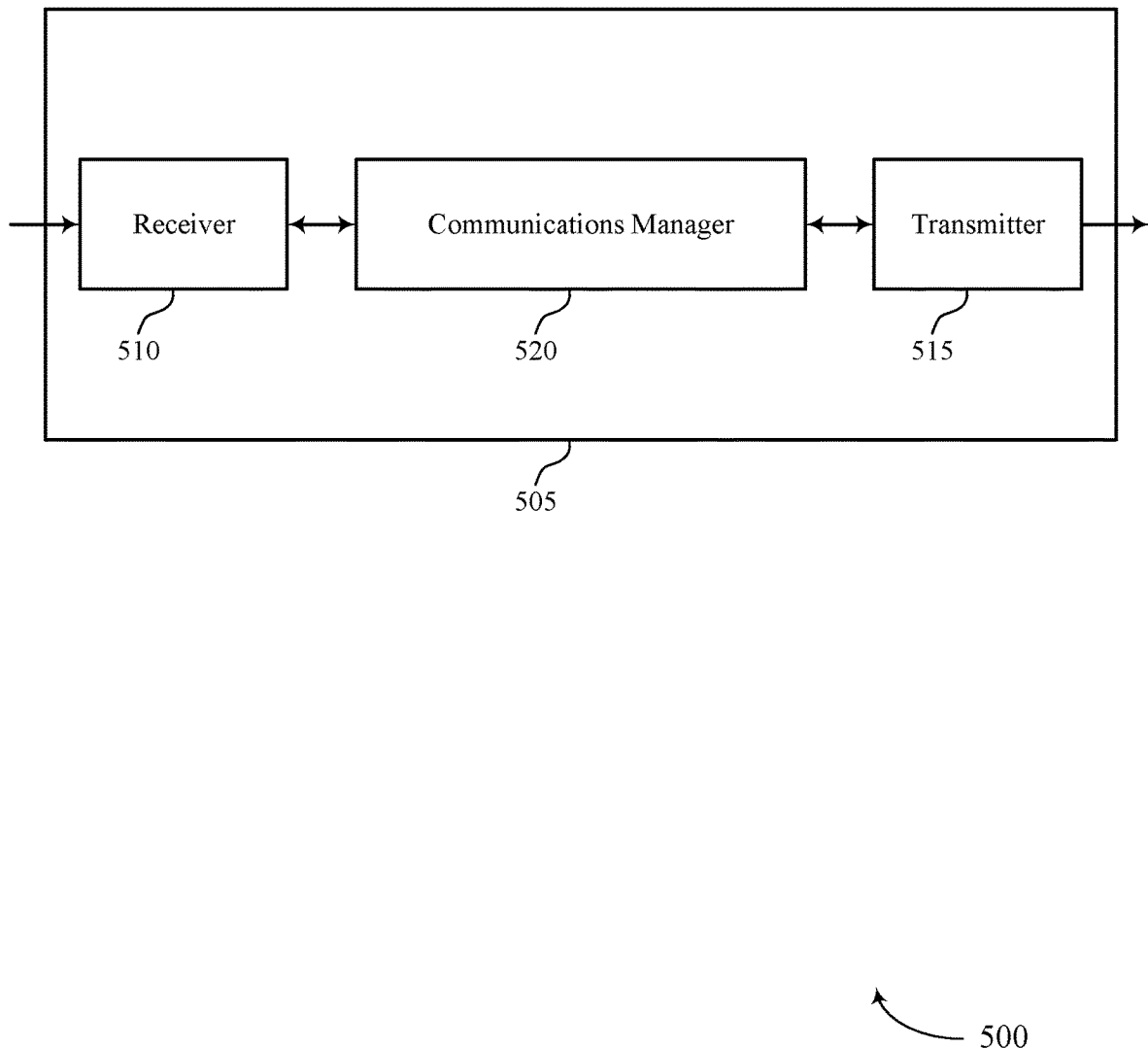
FIGS. 5 and 6 show block diagrams of devices that support amplitude control capability indication in accordance with aspects of the present disclosure.

FIG. 5 shows a block diagram 500 of a device 505 that supports amplitude control capability indication in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to amplitude control capability indication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to amplitude control capability indication). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of amplitude control capability indication as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for transmitting, to a base station, control signaling indicating a capability of the UE to apply an amplitude control procedure to one or more antenna elements of a set of multiple antenna elements for beamforming and indicating that the UE is applying the amplitude control procedure. The communications manager 520 may be configured as or otherwise support a means for receiving, from the base station, a control message scheduling transmission of an uplink message based on the control signaling. The communications manager 520 may be configured as or otherwise support a means for generating, by the UE using the amplitude control procedure, a signal including the uplink message for beamformed transmission via the one or more antenna elements of the set of multiple antenna elements based on the amplitude control procedure adjusting one or more amplitudes of the signal for transmission via at least one antenna element of the set of multiple antenna elements. The communications manager 520 may be configured as or otherwise support a means for transmitting the signal via the set of multiple antenna elements based on the generating.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for amplitude control in mmW systems which may reduce power consumption and reduce latency at the UE. The techniques described herein may further mitigate interference and improve spectral efficiency and robustness.

Figure 6:
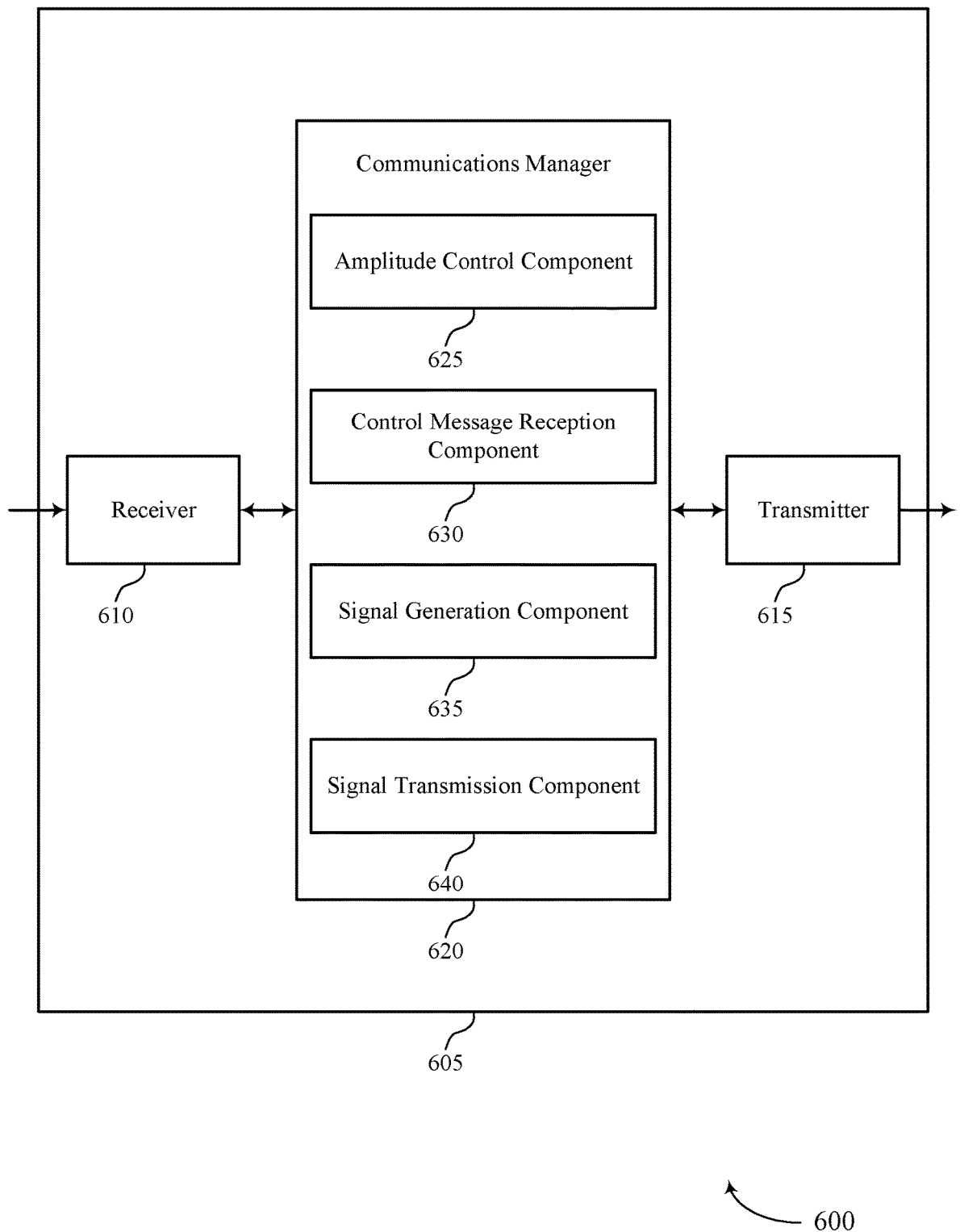

FIG. 6 shows a block diagram 600 of a device 605 that supports amplitude control capability indication in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to amplitude control capability indication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to amplitude control capability indication). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of amplitude control capability indication as described herein. For example, the communications manager 620 may include an amplitude control component 625, a control message reception component 630, a signal generation component 635, a signal transmission component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The amplitude control component 625 may be configured as or otherwise support a means for transmitting, to a base station, control signaling indicating a capability of the UE to apply an amplitude control procedure to one or more antenna elements of a set of multiple antenna elements for beamforming and indicating that the UE is applying the amplitude control procedure. The control message reception component 630 may be configured as or otherwise support a means for receiving, from the base station, a control message scheduling transmission of an uplink message based on the control signaling. The signal generation component 635 may be configured as or otherwise support a means for generating, by the UE using the amplitude control procedure, a signal including the uplink message for beamformed transmission via the one or more antenna elements of the set of multiple antenna elements based on the amplitude control procedure adjusting one or more amplitudes of the signal for transmission via at least one antenna element of the set of multiple antenna elements. The signal transmission component 640 may be configured as or otherwise support a means for transmitting the signal via the set of multiple antenna elements based on the generating.

Figure 7:
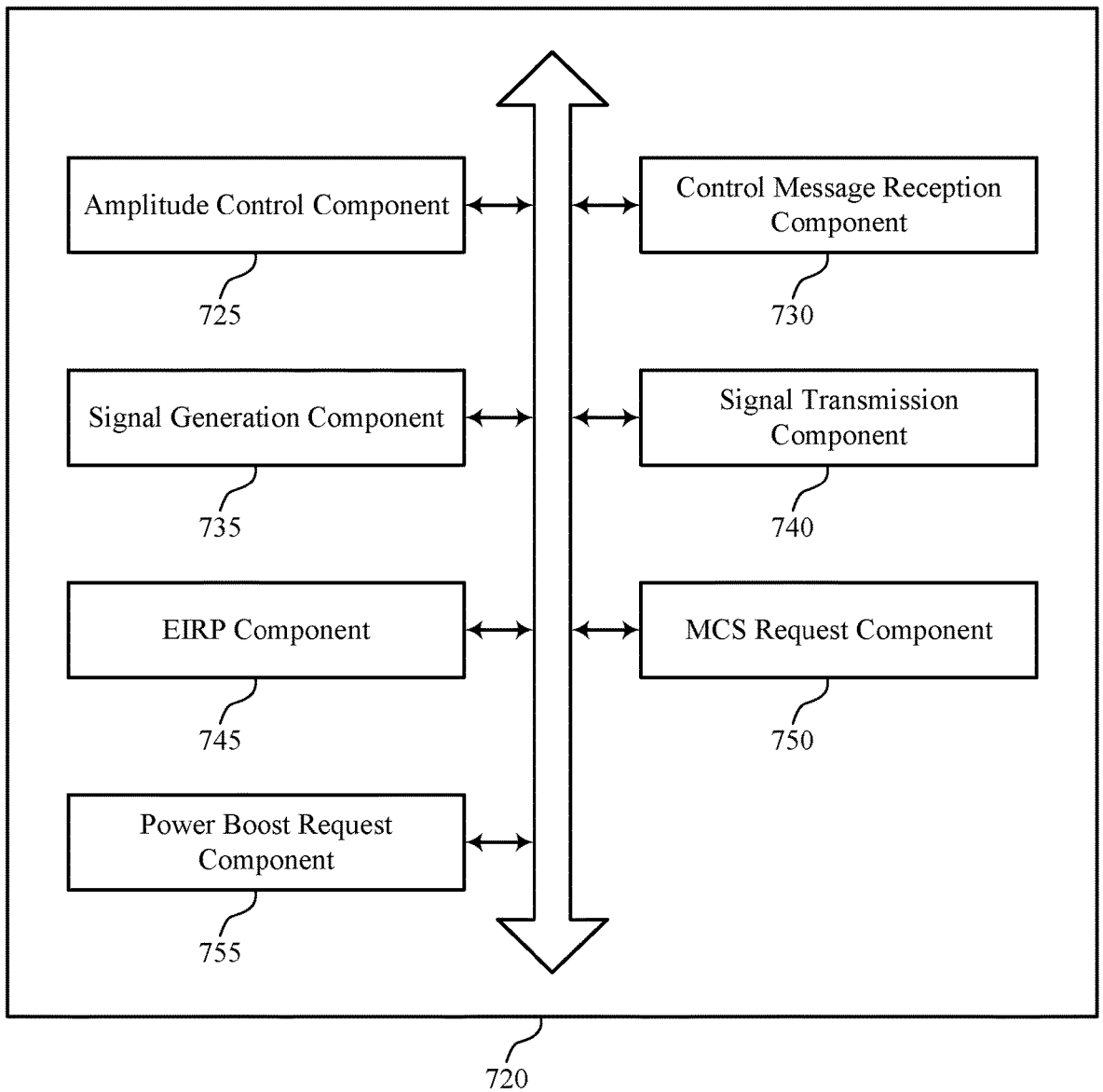
FIG. 7 shows a block diagram of a communications manager that supports amplitude control capability indication in accordance with aspects of the present disclosure.

FIG. 7 shows a block diagram 700 of a communications manager 720 that supports amplitude control capability indication in accordance with aspects of the present disclosure. The communications manager 720 may be an example of aspects of a communications manager 520, a communications manager 620, or both, as described herein. The communications manager 720, or various components thereof, may be an example of means for performing various aspects of amplitude control capability indication as described herein. For example, the communications manager 720 may include an amplitude control component 725, a control message reception component 730, a signal generation component 735, a signal transmission component 740, an EIRP component 745, an MCS request component 750, a power boost request component 755, or any combination thereof. Each of these components may communicate, directly or indirectly, with one another (e.g., via one or more buses).

The communications manager 720 may support wireless communications at a UE in accordance with examples as disclosed herein. The amplitude control component 725 may be configured as or otherwise support a means for transmitting, to a base station, control signaling indicating a capability of the UE to apply an amplitude control procedure to one or more antenna elements of a set of multiple antenna elements for beamforming and indicating that the UE is applying the amplitude control procedure. The control message reception component 730 may be configured as or otherwise support a means for receiving, from the base station, a control message scheduling transmission of an uplink message based on the control signaling. The signal generation component 735 may be configured as or otherwise support a means for generating, by the UE using the amplitude control procedure, a signal including the uplink message for beamformed transmission via the one or more antenna elements of the set of multiple antenna elements based on the amplitude control procedure adjusting one or more amplitudes of the signal for transmission via at least one antenna element of the set of multiple antenna elements. The signal transmission component 740 may be configured as or otherwise support a means for transmitting the signal via the set of multiple antenna elements based on the generating.

In some examples, the EIRP component 745 may be configured as or otherwise support a means for transmitting the control signaling indicating an amount of loss in EIRP of the signal based on generating the signal using the amplitude control procedure.

In some examples, to support transmitting the control signaling, the amplitude control component 725 may be configured as or otherwise support a means for transmitting the control signaling including a bit field indicating the capability.

In some examples, to support transmitting the control signaling, the amplitude control component 725 may be configured as or otherwise support a means for transmitting the control signaling indicating a quantization amplitude adjustment level applied by the amplitude control procedure.

In some examples, to support transmitting the control signaling, the amplitude control component 725 may be configured as or otherwise support a means for transmitting the control signaling indicating a quantization amplitude adjustment range applied by the amplitude control procedure.

In some examples, to support transmitting the control signaling, the amplitude control component 725 may be configured as or otherwise support a means for transmitting the control signaling indicating which of uniform or non-uniform quantization amplitude adjustment is applied by the amplitude control procedure.

In some examples, to support transmitting the control signaling, the amplitude control component 725 may be configured as or otherwise support a means for transmitting control signaling indicating that the capability is a semi-persistent capability indicating that the amplitude control procedure is being applied for a defined time period.

In some examples, to support transmitting the control signaling, the MCS request component 750 may be configured as or otherwise support a means for transmitting the control signaling including a request for the base station to apply a first MCS of a set of multiple available MCSs for downlink transmission based on the control signaling indicating that the UE is applying the amplitude control procedure.

In some examples, to support transmitting the control signaling, the power boost request component 755 may be configured as or otherwise support a means for transmitting the control signaling including a request for the base station to apply a power boost for one or more downlink transmissions based on the control signaling indicating that the UE is applying the amplitude control procedure.

Figure 8:
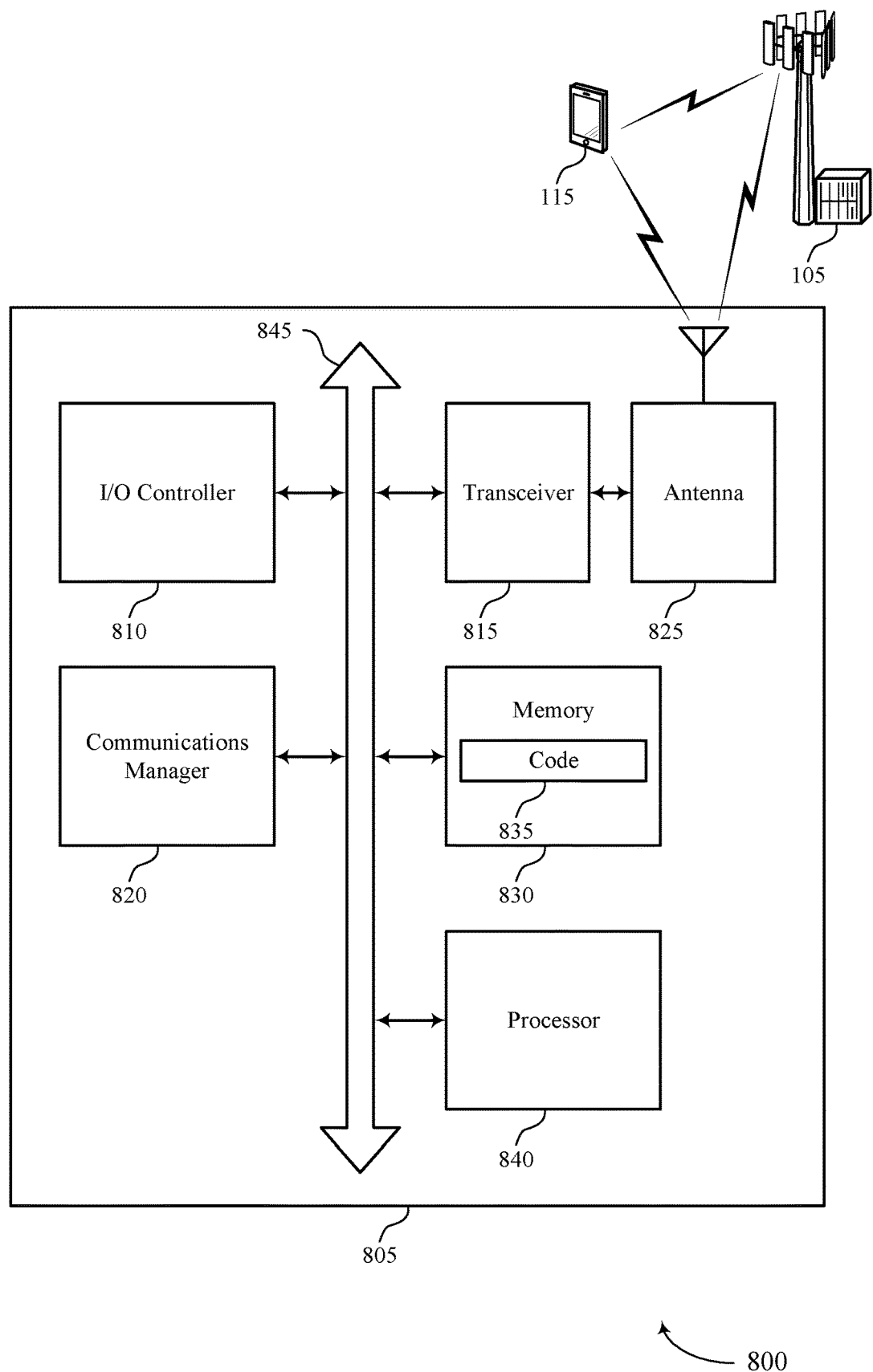
FIG. 8 shows a diagram of a system including a device that supports amplitude control capability indication in accordance with aspects of the present disclosure.

FIG. 8 shows a diagram of a system 800 including a device 805 that supports amplitude control capability indication in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting amplitude control capability indication). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting, to a base station, control signaling indicating a capability of the UE to apply an amplitude control procedure to one or more antenna elements of a set of multiple antenna elements for beamforming and indicating that the UE is applying the amplitude control procedure. The communications manager 820 may be configured as or otherwise support a means for receiving, from the base station, a control message scheduling transmission of an uplink message based on the control signaling. The communications manager 820 may be configured as or otherwise support a means for generating, by the UE using the amplitude control procedure, a signal including the uplink message for beamformed transmission via the one or more antenna elements of the set of multiple antenna elements based on the amplitude control procedure adjusting one or more amplitudes of the signal for transmission via at least one antenna element of the set of multiple antenna elements. The communications manager 820 may be configured as or otherwise support a means for transmitting the signal via the set of multiple antenna elements based on the generating.

By including or configuring the communications manager 820 in accordance with examples as described herein, the device 805 may support techniques for amplitude control in mmW systems which may reduce power consumption and reduce latency at the UE. The techniques described herein may further mitigate interference and improve spectral efficiency and robustness.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of amplitude control capability indication as described herein, or the processor 840 and the memory 830 may be otherwise configured to perform or support such operations.

Figure 9:
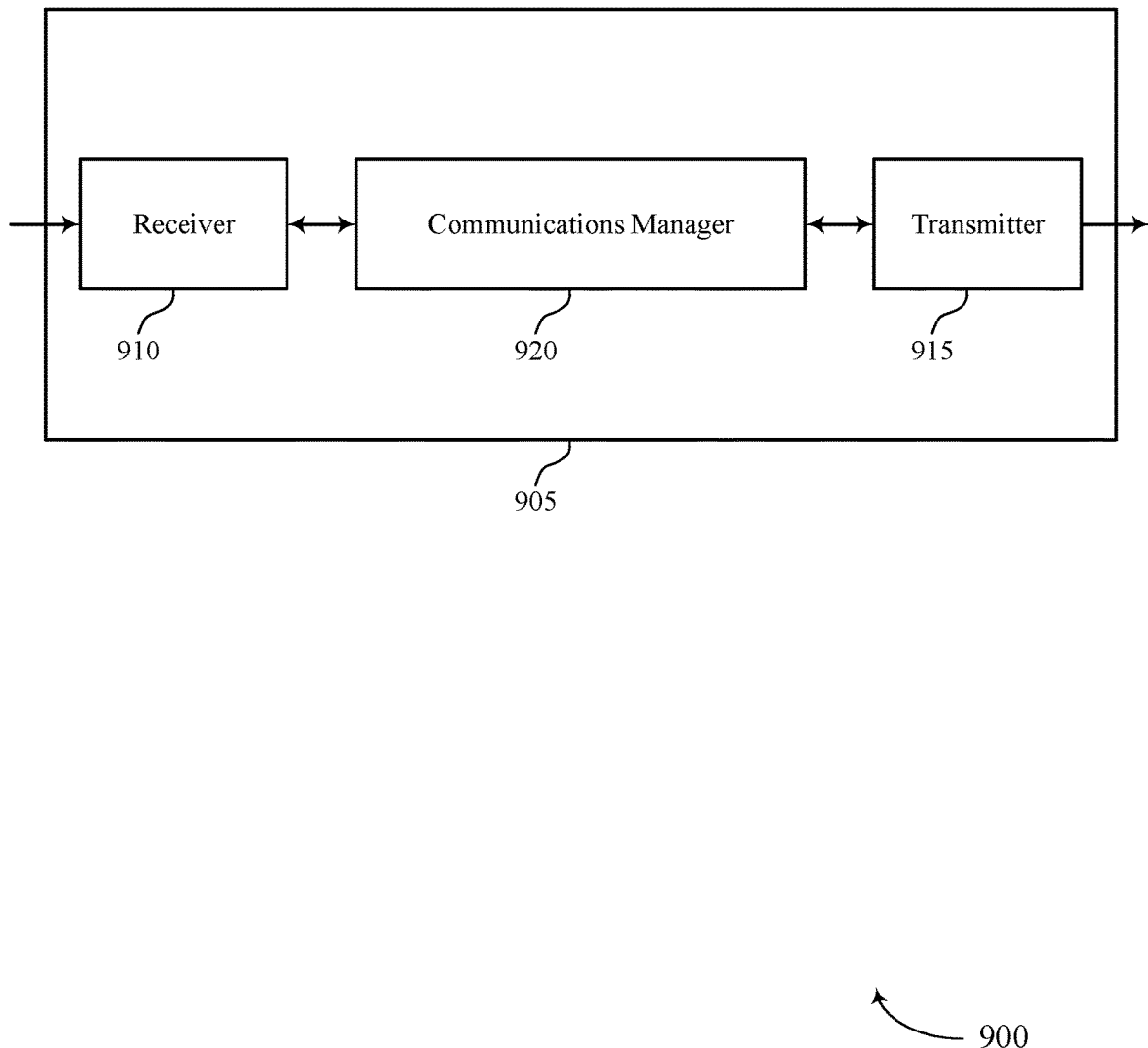
FIGS. 9 and 10 show block diagrams of devices that support amplitude control capability indication in accordance with aspects of the present disclosure.

FIG. 9 shows a block diagram 900 of a device 905 that supports amplitude control capability indication in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to amplitude control capability indication). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to amplitude control capability indication). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of amplitude control capability indication as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, control signaling indicating a capability of the UE to apply an amplitude control procedure to one or more antenna elements of a set of multiple antenna elements for beamforming and indicating that the UE is applying the amplitude control procedure. The communications manager 920 may be configured as or otherwise support a means for transmitting, to the UE, a control message scheduling transmission of an uplink message. The communications manager 920 may be configured as or otherwise support a means for monitoring for a signal including the uplink message based on the control signaling and the control message.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for amplitude control in mmW systems which may reduce power consumption and reduce latency at the UE. The techniques described herein may further mitigate interference and improve spectral efficiency and robustness.

Figure 10:
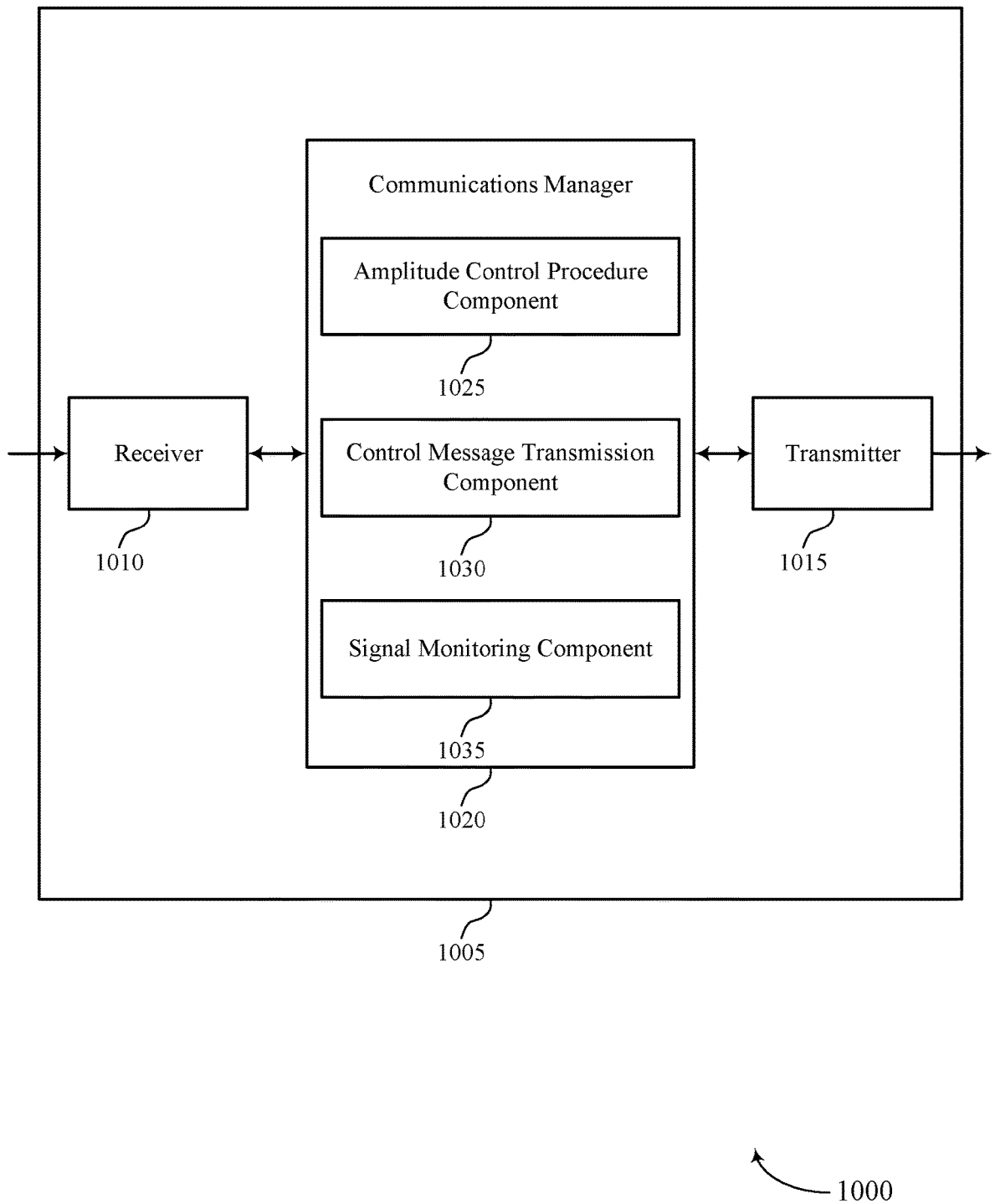

FIG. 10 shows a block diagram 1000 of a device 1005 that supports amplitude control capability indication in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to amplitude control capability indication). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to amplitude control capability indication). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of amplitude control capability indication as described herein.

For example, the communications manager 1020 may include an amplitude control procedure component 1025, a control message transmission component 1030, a signal monitoring component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The amplitude control procedure component 1025 may be configured as or otherwise support a means for receiving, from a UE, control signaling indicating a capability of the UE to apply an amplitude control procedure to one or more antenna elements of a set of multiple antenna elements for beamforming and indicating that the UE is applying the amplitude control procedure. The control message transmission component 1030 may be configured as or otherwise support a means for transmitting, to the UE, a control message scheduling transmission of an uplink message. The signal monitoring component 1035 may be configured as or otherwise support a means for monitoring for a signal including the uplink message based on the control signaling and the control message.

Figure 11:
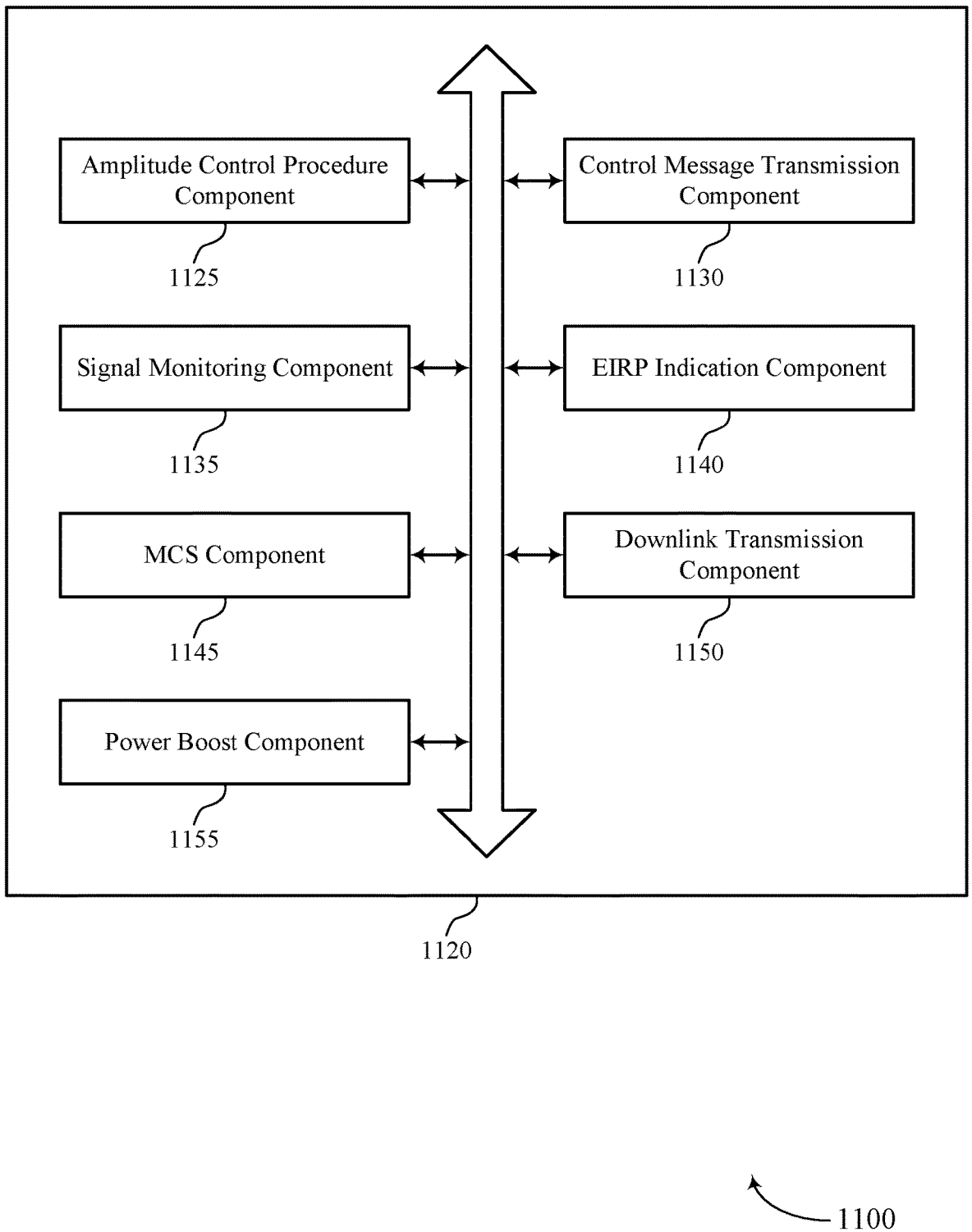
FIG. 11 shows a block diagram of a communications manager that supports amplitude control capability indication in accordance with aspects of the present disclosure.

FIG. 11 shows a block diagram 1100 of a communications manager 1120 that supports amplitude control capability indication in accordance with aspects of the present disclosure. The communications manager 1120 may be an example of aspects of a communications manager 920, a communications manager 1020, or both, as described herein. The communications manager 1120, or various components thereof, may be an example of means for performing various aspects of amplitude control capability indication as described herein. For example, the communications manager 1120 may include an amplitude control procedure component 1125, a control message transmission component 1130, a signal monitoring component 1135, an EIRP indication component 1140, an MCS component 1145, a downlink transmission component 1150, a power boost component 1155, or any combination thereof. Each of these components may communicate, directly or indirectly, with one another (e.g., via one or more buses).

The communications manager 1120 may support wireless communications at a base station in accordance with examples as disclosed herein. The amplitude control procedure component 1125 may be configured as or otherwise support a means for receiving, from a UE, control signaling indicating a capability of the UE to apply an amplitude control procedure to one or more antenna elements of a set of multiple antenna elements for beamforming and indicating that the UE is applying the amplitude control procedure. The control message transmission component 1130 may be configured as or otherwise support a means for transmitting, to the UE, a control message scheduling transmission of an uplink message. The signal monitoring component 1135 may be configured as or otherwise support a means for monitoring for a signal including the uplink message based on the control signaling and the control message.

In some examples, the EIRP indication component 1140 may be configured as or otherwise support a means for receiving the control signaling indicating an amount of loss in EIRP of the signal based on the control signaling indicating that the UE is applying the amplitude control procedure. In some examples, the MCS component 1145 may be configured as or otherwise support a means for transmitting, to the UE, the control message including an indication to use a lower order MCS for transmitting the uplink message as compared to a second MCS used during transmission of a prior uplink message based on the indicated amount of loss. In some examples, the downlink transmission component 1150 may be configured as or otherwise support a means for transmitting, to the UE, one or more downlink transmissions using the lower order MCS or with an applied power boost based on the indicated amount of loss.

In some examples, the EIRP indication component 1140 may be configured as or otherwise support a means for receiving the control signaling indicating an amount of loss in EIRP of the signal based on the control signaling indicating that the UE is applying the amplitude control procedure. In some examples, the downlink transmission component 1150 may be configured as or otherwise support a means for transmitting, to the UE, one or more downlink transmissions with an applied power boost based on the indicated amount of loss.

In some examples, to support receiving the control signaling, the amplitude control procedure component 1125 may be configured as or otherwise support a means for receiving the control signaling including a bit field indicating the capability.

In some examples, to support receiving the control signaling, the amplitude control procedure component 1125 may be configured as or otherwise support a means for receiving the control signaling indicating a quantization amplitude adjustment level applied by the amplitude control procedure.

In some examples, to support receiving the control signaling, the amplitude control procedure component 1125 may be configured as or otherwise support a means for receiving the control signaling indicating a quantization amplitude adjustment range applied by the amplitude control procedure.

In some examples, to support receiving the control signaling, the amplitude control procedure component 1125 may be configured as or otherwise support a means for receiving the control signaling indicating which of uniform or non-uniform quantization amplitude adjustment is applied by the amplitude control procedure.

In some examples, to support receiving the control signaling, the amplitude control procedure component 1125 may be configured as or otherwise support a means for receiving the control signaling indicating that the capability is a semi-persistent capability indicating that the amplitude control procedure is being applied for a defined time period.

In some examples, to support receiving the control signaling, the MCS component 1145 may be configured as or otherwise support a means for receiving the control signaling including a request for the base station to use a first MCS of a set of multiple available MCSs for downlink transmission. In some examples, to support receiving the control signaling, the downlink transmission component 1150 may be configured as or otherwise support a means for transmitting a downlink message to the UE in accordance with the first MCS.

In some examples, the MCS component 1145 may be configured as or otherwise support a means for selecting a subset of available MCSs for decoding a resource allocated for the uplink message based on the control signaling indicating that the UE is applying the amplitude control procedure.

In some examples, to support receiving the control signaling, the power boost component 1155 may be configured as or otherwise support a means for receiving the control signaling including a request for the base station to apply a power boost for downlink transmission based on the control signaling indicating that the UE is applying the amplitude control procedure. In some examples, to support receiving the control signaling, the downlink transmission component 1150 may be configured as or otherwise support a means for transmitting a downlink message to the UE with an applied power boost based on the control signaling.

Figure 12:
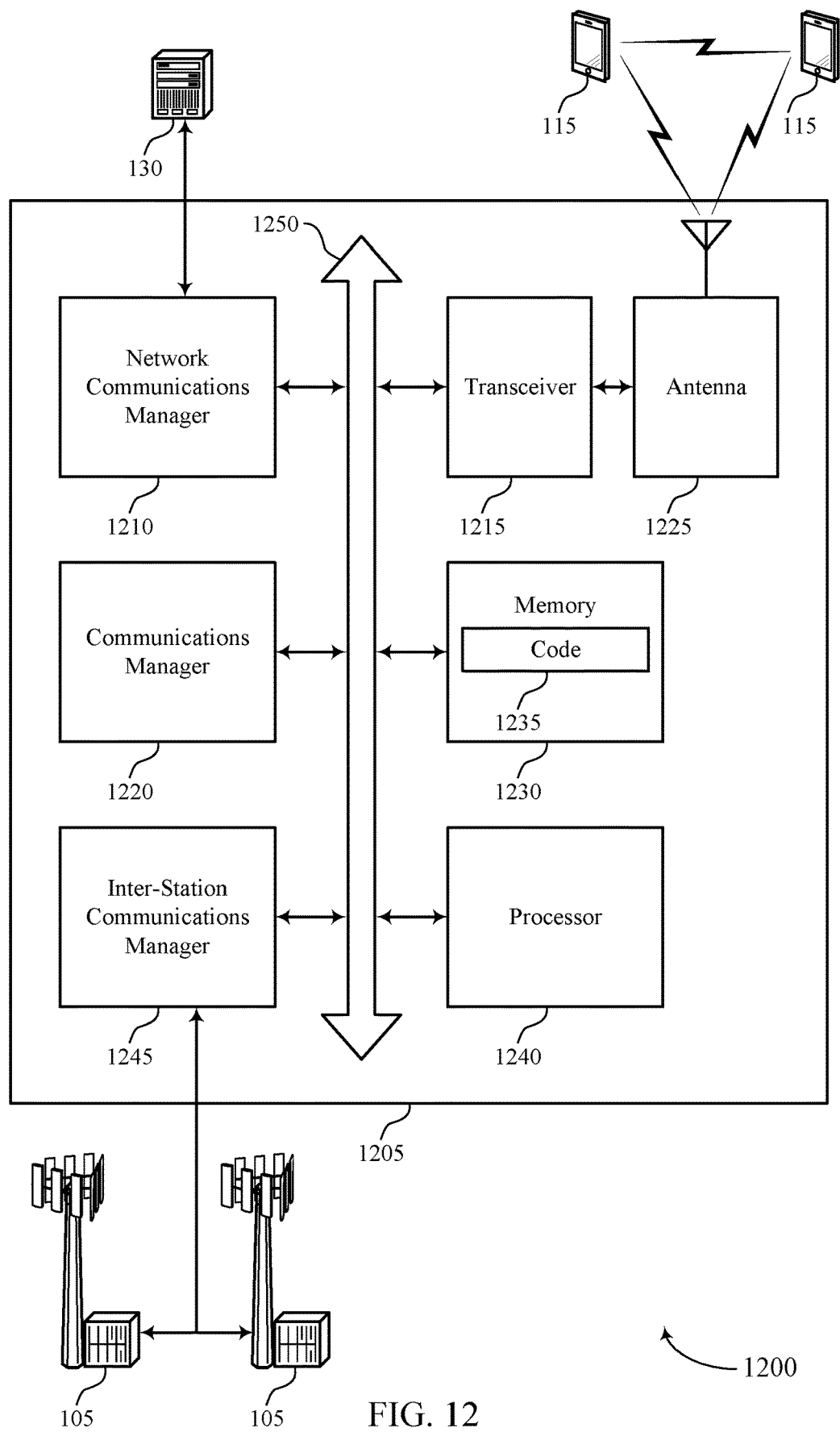
FIG. 12 shows a diagram of a system including a device that supports amplitude control capability indication in accordance with aspects of the present disclosure.

FIG. 12 shows a diagram of a system 1200 including a device 1205 that supports amplitude control capability indication in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting amplitude control capability indication). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, control signaling indicating a capability of the UE to apply an amplitude control procedure to one or more antenna elements of a set of multiple antenna elements for beamforming and indicating that the UE is applying the amplitude control procedure. The communications manager 1220 may be configured as or otherwise support a means for transmitting, to the UE, a control message scheduling transmission of an uplink message. The communications manager 1220 may be configured as or otherwise support a means for monitoring for a signal including the uplink message based on the control signaling and the control message.

By including or configuring the communications manager 1220 in accordance with examples as described herein, the device 1205 may support techniques for amplitude control in mmW systems which may reduce power consumption and reduce latency at the UE. The techniques described herein may further mitigate interference and improve spectral efficiency and robustness.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of amplitude control capability indication as described herein, or the processor 1240 and the memory 1230 may be otherwise configured to perform or support such operations.

Figure 13:
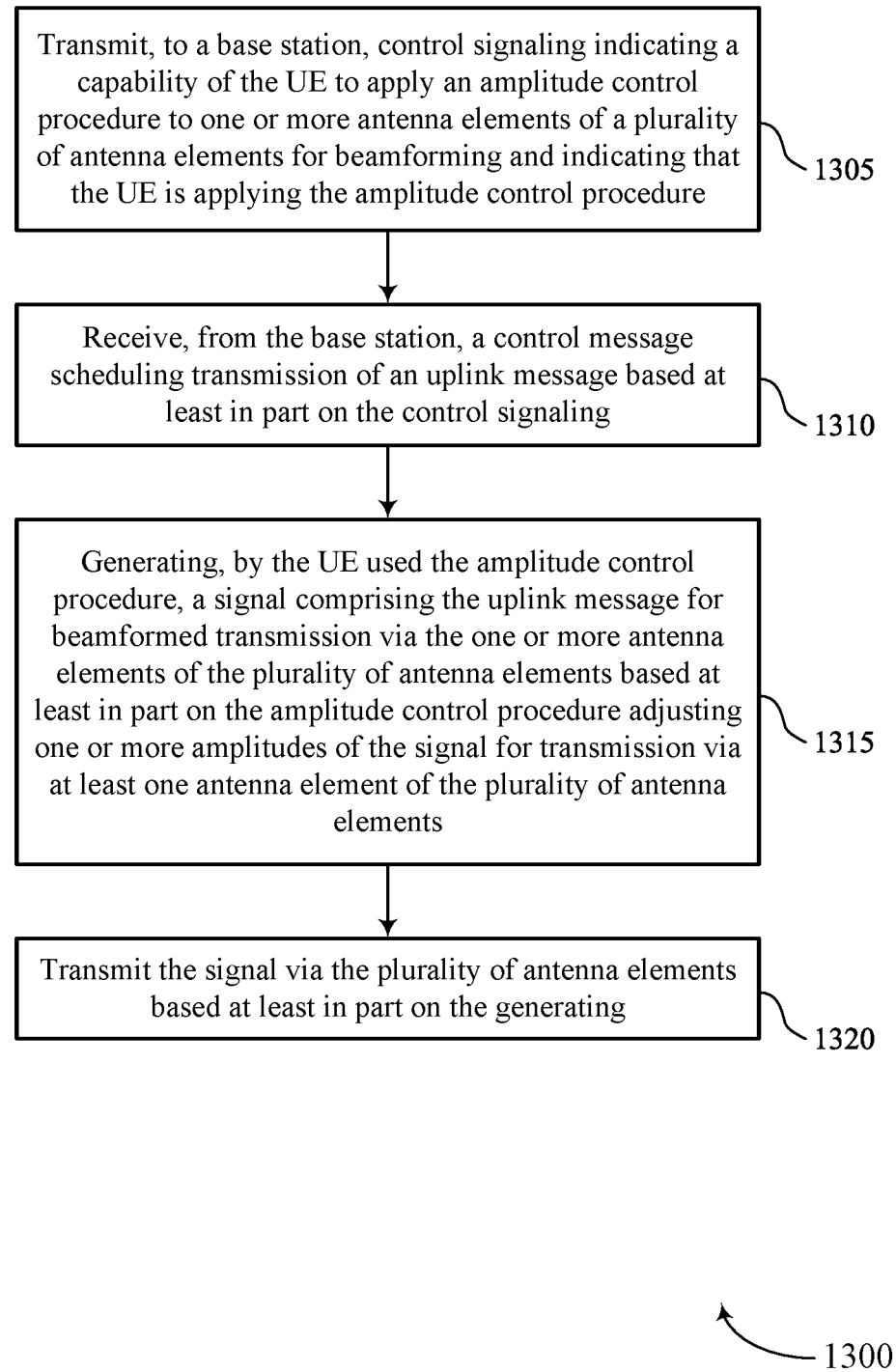
FIGS. 13 through 16 show flowcharts illustrating methods that support amplitude control capability indication in accordance with aspects of the present disclosure.

FIG. 13 shows a flowchart illustrating a method 1300 that supports amplitude control capability indication in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, control signaling indicating a capability of the UE to apply an amplitude control procedure to one or more antenna elements of a set of multiple antenna elements for beamforming and indicating that the UE is applying the amplitude control procedure. The operations of 1305 may be performed in accordance with examples as disclosed herein. In some examples, aspects of the operations of 1305 may be performed by an amplitude control component 725 as described with reference to FIG. 7.

At 1310, the method may include receiving, from the base station, a control message scheduling transmission of an uplink message based on the control signaling. The operations of 1310 may be performed in accordance with examples as disclosed herein. In some examples, aspects of the operations of 1310 may be performed by a control message reception component 730 as described with reference to FIG. 7.

At 1315, the method may include generating, by the UE using the amplitude control procedure, a signal including the uplink message for beamformed transmission via the one or more antenna elements of the set of multiple antenna elements based on the amplitude control procedure adjusting one or more amplitudes of the signal for transmission via at least one antenna element of the set of multiple antenna elements. The operations of 1315 may be performed in accordance with examples as disclosed herein. In some examples, aspects of the operations of 1315 may be performed by a signal generation component 735 as described with reference to FIG. 7.

At 1320, the method may include transmitting the signal via the set of multiple antenna elements based on the generating. The operations of 1320 may be performed in accordance with examples as disclosed herein. In some examples, aspects of the operations of 1320 may be performed by a signal transmission component 740 as described with reference to FIG. 7.

Figure 14:
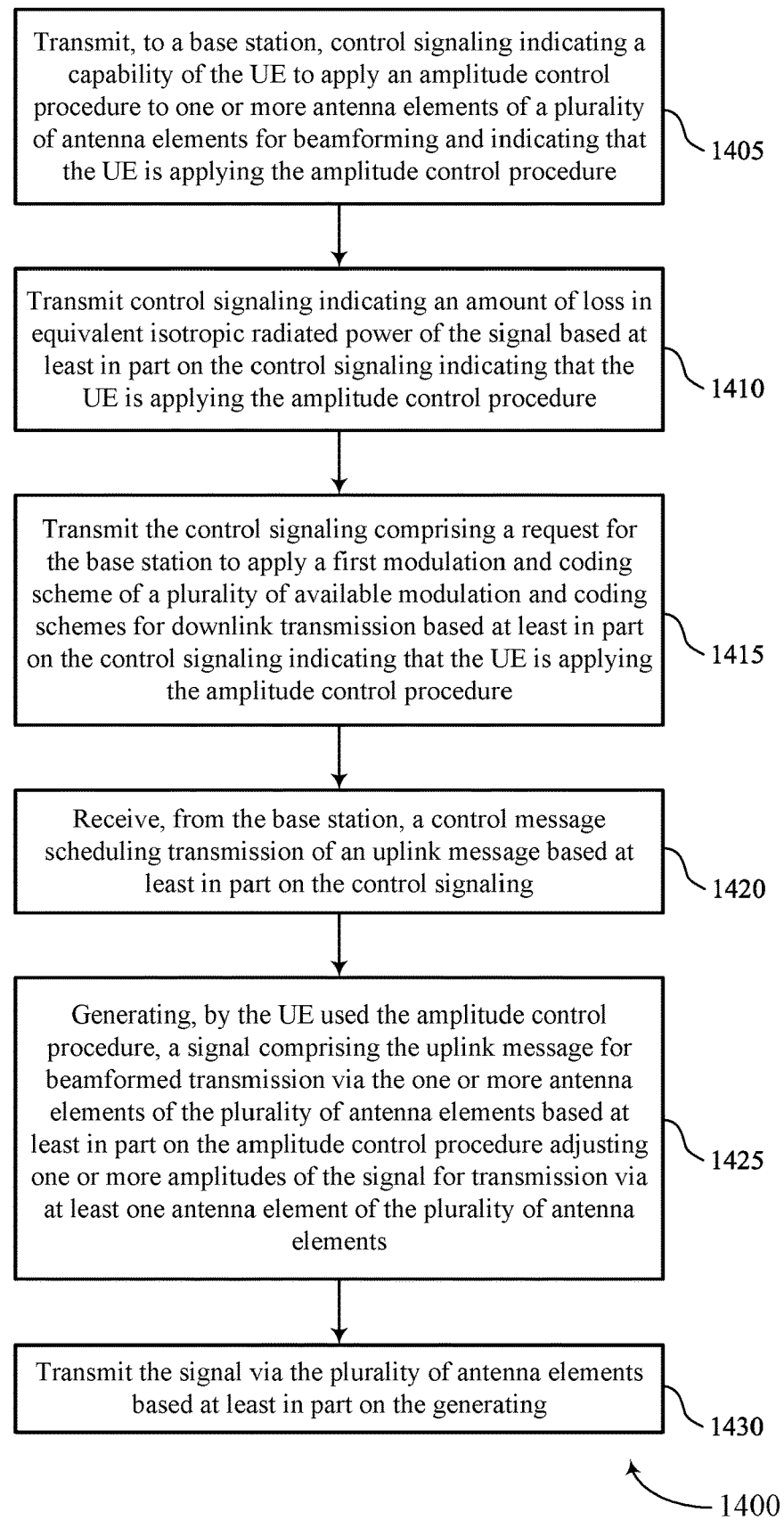

FIG. 14 shows a flowchart illustrating a method 1400 that supports amplitude control capability indication in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, control signaling indicating a capability of the UE to apply an amplitude control procedure to one or more antenna elements of a set of multiple antenna elements for beamforming and indicating that the UE is applying the amplitude control procedure. The operations of 1405 may be performed in accordance with examples as disclosed herein. In some examples, aspects of the operations of 1405 may be performed by an amplitude control component 725 as described with reference to FIG. 7.

At 1410, the method may include transmitting the control signaling indicating an amount of loss in EIRP of the signal based on generating the signal using the amplitude control procedure. The operations of 1410 may be performed in accordance with examples as disclosed herein. In some examples, aspects of the operations of 1410 may be performed by an EIRP component 745 as described with reference to FIG. 7.

At 1415, the method may include transmitting the control signaling including a request for the base station to apply a first MCS of a set of multiple available MCSs for downlink transmission based on the control signaling indicating that the UE is applying the amplitude control procedure. The operations of 1415 may be performed in accordance with examples as disclosed herein. In some examples, aspects of the operations of 1415 may be performed by an MCS request component 750 as described with reference to FIG. 7.

At 1420, the method may include receiving, from the base station, a control message scheduling transmission of an uplink message based on the control signaling. The operations of 1420 may be performed in accordance with examples as disclosed herein. In some examples, aspects of the operations of 1420 may be performed by a control message reception component 730 as described with reference to FIG. 7.

At 1425, the method may include generating, by the UE using the amplitude control procedure, a signal including the uplink message for beamformed transmission via the one or more antenna elements of the set of multiple antenna elements based on the amplitude control procedure adjusting one or more amplitudes of the signal for transmission via at least one antenna element of the set of multiple antenna elements. The operations of 1425 may be performed in accordance with examples as disclosed herein. In some examples, aspects of the operations of 1425 may be performed by a signal generation component 735 as described with reference to FIG. 7.

At 1430, the method may include transmitting the signal via the set of multiple antenna elements based on the generating. The operations of 1430 may be performed in accordance with examples as disclosed herein. In some examples, aspects of the operations of 1430 may be performed by a signal transmission component 740 as described with reference to FIG. 7.

Figure 15:
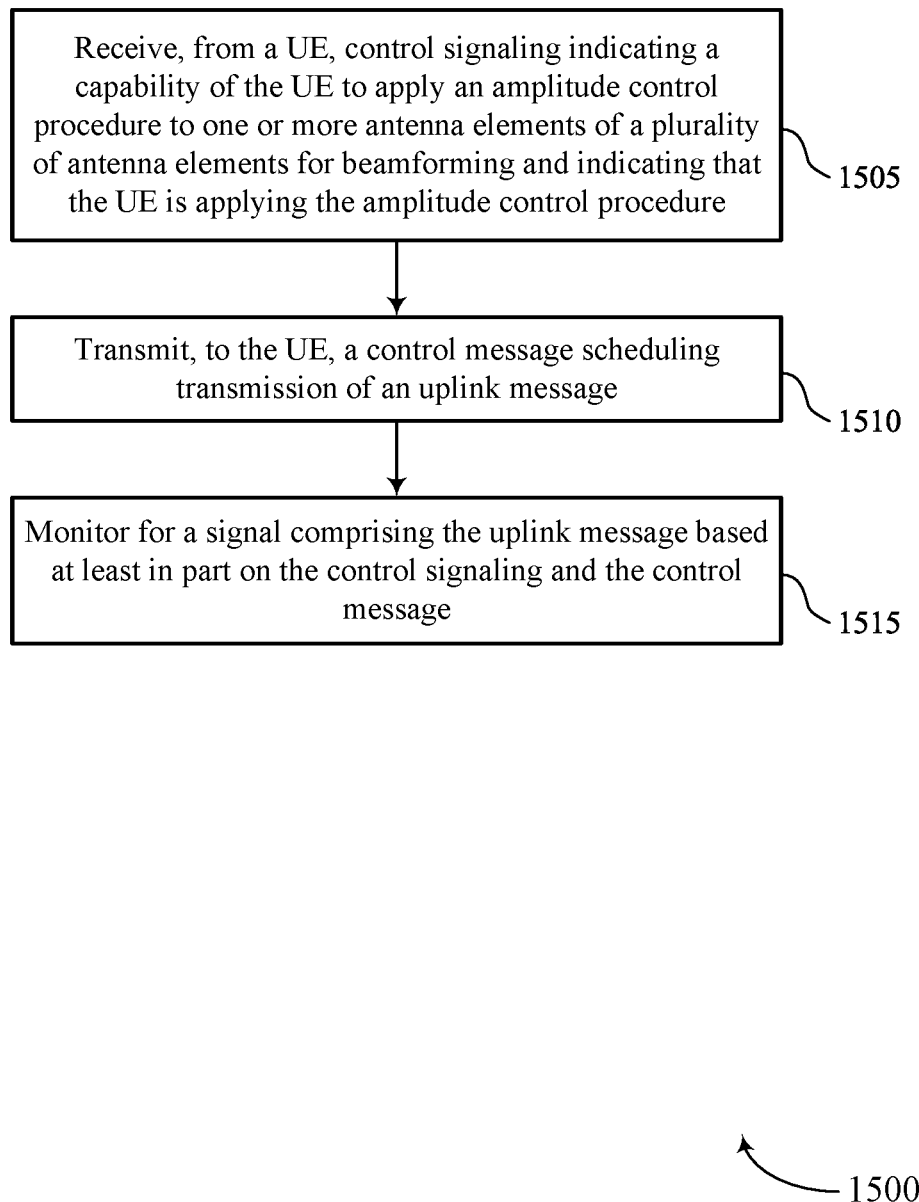

FIG. 15 shows a flowchart illustrating a method 1500 that supports amplitude control capability indication in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, control signaling indicating a capability of the UE to apply an amplitude control procedure to one or more antenna elements of a set of multiple antenna elements for beamforming and indicating that the UE is applying the amplitude control procedure. The operations of 1505 may be performed in accordance with examples as disclosed herein. In some examples, aspects of the operations of 1505 may be performed by an amplitude control procedure component 1125 as described with reference to FIG. 11.

At 1510, the method may include transmitting, to the UE, a control message scheduling transmission of an uplink message. The operations of 1510 may be performed in accordance with examples as disclosed herein. In some examples, aspects of the operations of 1510 may be performed by a control message transmission component 1130 as described with reference to FIG. 11.

At 1515, the method may include monitoring for a signal including the uplink message based on the control signaling and the control message. The operations of 1515 may be performed in accordance with examples as disclosed herein. In some examples, aspects of the operations of 1515 may be performed by a signal monitoring component 1135 as described with reference to FIG. 11.

Figure 16:
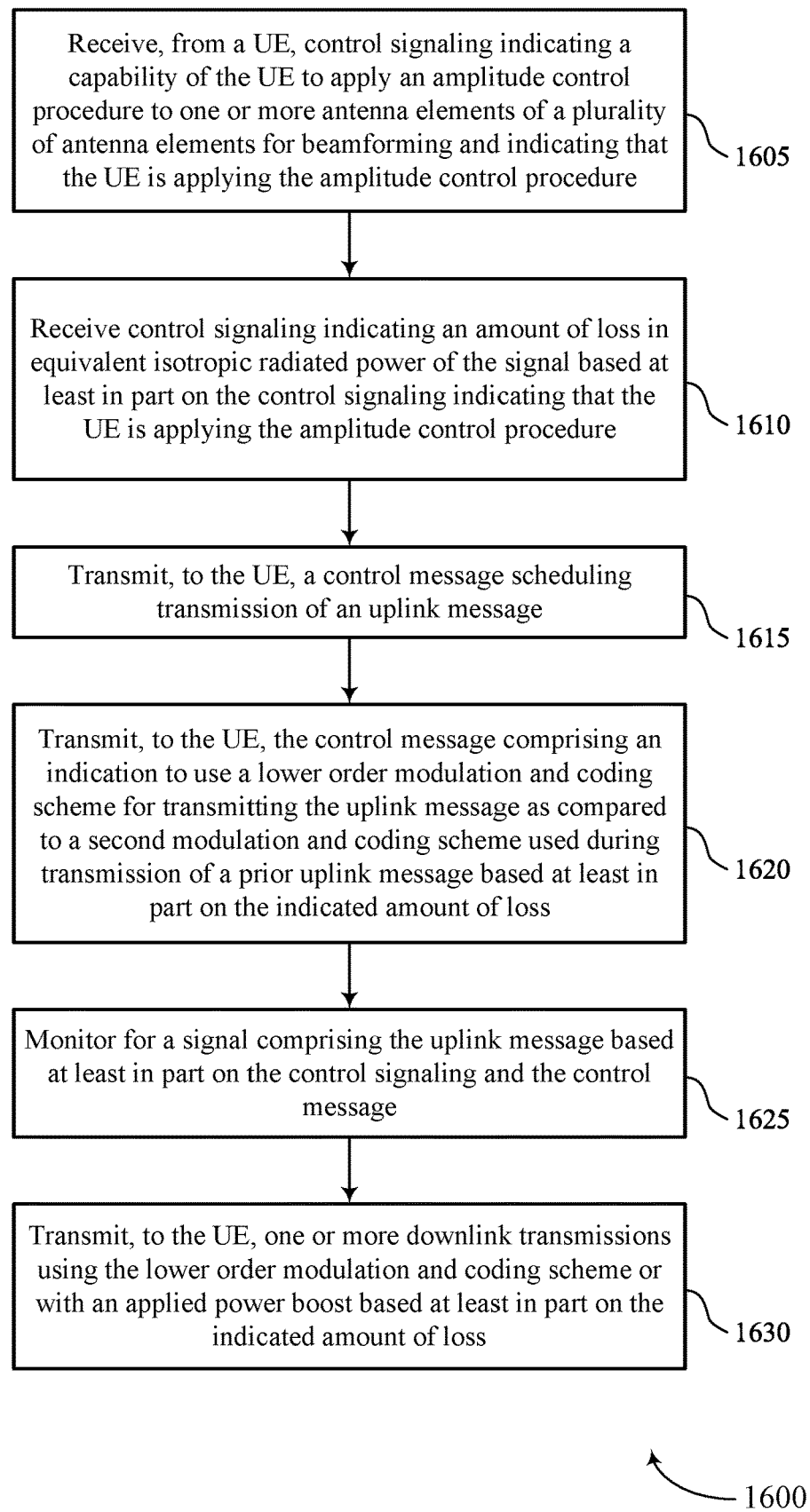

FIG. 16 shows a flowchart illustrating a method 1600 that supports amplitude control capability indication in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, control signaling indicating a capability of the UE to apply an amplitude control procedure to one or more antenna elements of a set of multiple antenna elements for beamforming and indicating that the UE is applying the amplitude control procedure. The operations of 1605 may be performed in accordance with examples as disclosed herein. In some examples, aspects of the operations of 1605 may be performed by an amplitude control procedure component 1125 as described with reference to FIG. 11.

At 1610, the method may include receiving the control signaling indicating an amount of loss in EIRP of the signal based on the control signaling indicating that the UE is applying the amplitude control procedure. The operations of 1610 may be performed in accordance with examples as disclosed herein. In some examples, aspects of the operations of 1610 may be performed by an EIRP indication component 1140 as described with reference to FIG. 11.

At 1615, the method may include transmitting, to the UE, a control message scheduling transmission of an uplink message. The operations of 1615 may be performed in accordance with examples as disclosed herein. In some examples, aspects of the operations of 1615 may be performed by a control message transmission component 1130 as described with reference to FIG. 11.

At 1620, the method may include transmitting, to the UE, the control message including an indication to use a lower order MCS for transmitting the uplink message as compared to a second MCS used during transmission of a prior uplink message based on the indicated amount of loss. The operations of 1620 may be performed in accordance with examples as disclosed herein. In some examples, aspects of the operations of 1620 may be performed by an MCS component 1145 as described with reference to FIG. 11.

At 1625, the method may include monitoring for a signal including the uplink message based on the control signaling and the control message. The operations of 1625 may be performed in accordance with examples as disclosed herein. In some examples, aspects of the operations of 1625 may be performed by a signal monitoring component 1135 as described with reference to FIG. 11.

At 1630, the method may include transmitting, to the UE, one or more downlink transmissions using the lower order MCS or with an applied power boost based on the indicated amount of loss. The operations of 1630 may be performed in accordance with examples as disclosed herein. In some examples, aspects of the operations of 1630 may be performed by a downlink transmission component 1150 as described with reference to FIG. 11.

The following provides an overview of aspects of the present disclosure:

Aspect 1: A method for wireless communications at a UE, comprising: transmitting, to a base station, control signaling indicating a capability of the UE to apply an amplitude control procedure to one or more antenna elements of a plurality of antenna elements for beamforming and indicating that the UE is applying the amplitude control procedure; receiving, from the base station, a control message scheduling transmission of an uplink message based at least in part on the control signaling; generating, by the UE using the amplitude control procedure, a signal comprising the uplink message for beamformed transmission via the one or more antenna elements of the plurality of antenna elements based at least in part on the amplitude control procedure adjusting one or more amplitudes of the signal for transmission via at least one antenna element of the plurality of antenna elements; and transmitting the signal via the plurality of antenna elements based at least in part on the generating.

Aspect 2: The method of aspect 1, further comprising: transmitting the control signaling indicating an amount of loss in EIRP of the signal based at least in part on generating the signal using the amplitude control procedure.

Aspect 3: The method of any of aspects 1 through 2, wherein transmitting the control signaling further comprises: transmitting the control signaling comprising a bit field indicating the capability.

Aspect 4: The method of any of aspects 1 through 3, wherein transmitting the control signaling further comprises: transmitting the control signaling indicating a quantization amplitude adjustment level applied by the amplitude control procedure.

Aspect 5: The method of any of aspects 1 through 4, wherein transmitting the control signaling further comprises: transmitting the control signaling indicating a quantization amplitude adjustment range applied by the amplitude control procedure.

Aspect 6: The method of any of aspects 1 through 5, wherein transmitting the control signaling further comprises: transmitting the control signaling indicating which of uniform or non-uniform quantization amplitude adjustment is applied by the amplitude control procedure.

Aspect 7: The method of any of aspects 1 through 6, wherein transmitting the control signaling further comprises: transmitting control signaling indicating that the capability is a semi-persistent capability indicating that the amplitude control procedure is being applied for a defined time period.

Aspect 8: The method of any of aspects 1 through 7, wherein transmitting the control signaling further comprises: transmitting the control signaling comprising a request for the base station to apply a first MCS of a plurality of available MCSs for downlink transmission based at least in part on the control signaling indicating that the UE is applying the amplitude control procedure.

Aspect 9: The method of any of aspects 1 through 8, wherein transmitting the control signaling further comprises: transmitting the control signaling comprising a request for the base station to apply a power boost for one or more downlink transmissions based at least in part on the control signaling indicating that the UE is applying the amplitude control procedure.

Aspect 10: A method for wireless communications at a base station, comprising: receiving, from a UE, control signaling indicating a capability of the UE to apply an amplitude control procedure to one or more antenna elements of a plurality of antenna elements for beamforming and indicating that the UE is applying the amplitude control procedure; transmitting, to the UE, a control message scheduling transmission of an uplink message; and monitoring for a signal comprising the uplink message based at least in part on the control signaling and the control message.

Aspect 11: The method of aspect 10, further comprising: receiving the control signaling indicating an amount of loss in EIRP of the signal based at least in part on the control signaling indicating that the UE is applying the amplitude control procedure; transmitting, to the UE, the control message comprising an indication to use a lower order MCS for transmitting the uplink message as compared to a second MCS used during transmission of a prior uplink message based at least in part on the indicated amount of loss; and transmitting, to the UE, one or more downlink transmissions using the lower order MCS or with an applied power boost based at least in part on the indicated amount of loss.

Aspect 12: The method of any of aspects 10 through 11, further comprising: receiving the control signaling indicating an amount of loss in EIRP of the signal based at least in part on the control signaling indicating that the UE is applying the amplitude control procedure; and transmitting, to the UE, one or more downlink transmissions with an applied power boost based at least in part on the indicated amount of loss.

Aspect 13: The method of any of aspects 10 through 12, wherein receiving the control signaling further comprises: receiving the control signaling comprising a bit field indicating the capability.

Aspect 14: The method of any of aspects 10 through 13, wherein receiving the control signaling further comprises: receiving the control signaling indicating a quantization amplitude adjustment level applied by the amplitude control procedure.

Aspect 15: The method of any of aspects 10 through 14, wherein receiving the control signaling further comprises: receiving the control signaling indicating a quantization amplitude adjustment range applied by the amplitude control procedure.

Aspect 16: The method of any of aspects 10 through 15, wherein receiving the control signaling further comprises: receiving the control signaling indicating which of uniform or non-uniform quantization amplitude adjustment is applied by the amplitude control procedure.

Aspect 17: The method of any of aspects 10 through 16, wherein receiving the control signaling further comprises: receiving the control signaling indicating that the capability is a semi-persistent capability indicating that the amplitude control procedure is being applied for a defined time period.

Aspect 18: The method of any of aspects 10 through 17, wherein receiving the control signaling further comprises: receiving the control signaling comprising a request for the base station to use a first MCS of a plurality of available MCSs for downlink transmission; and transmitting a downlink message to the UE in accordance with the first MCS.

Aspect 19: The method of any of aspects 10 through 18, further comprising: selecting a subset of available MCSs for decoding a resource allocated for the uplink message based at least in part on the control signaling indicating that the UE is applying the amplitude control procedure.

Aspect 20: The method of any of aspects 10 through 19, wherein receiving the control signaling further comprises: receiving the control signaling comprising a request for the base station to apply a power boost for downlink transmission based at least in part on the control signaling indicating that the UE is applying the amplitude control procedure; and transmitting a downlink message to the UE with an applied power boost based at least in part on the control signaling.

Aspect 21: An apparatus for wireless communications at a UE, comprising a processor; memory coupled with the processor; and instructions stored in the memory and executable by the processor to cause the apparatus to perform a method of any of aspects 1 through 9.

Aspect 22: An apparatus for wireless communications at a UE, comprising at least one means for performing a method of any of aspects 1 through 9.

Aspect 23: A non-transitory computer-readable medium storing code for wireless communications at a UE, the code comprising instructions executable by a processor to perform a method of any of aspects 1 through 9.

Aspect 24: An apparatus for wireless communications at a base station, comprising a processor; memory coupled with the processor; and instructions stored in the memory and executable by the processor to cause the apparatus to perform a method of any of aspects 10 through 20.

Aspect 25: An apparatus for wireless communications at a base station, comprising at least one means for performing a method of any of aspects 10 through 20.

Aspect 26: A non-transitory computer-readable medium storing code for wireless communications at a base station, the code comprising instructions executable by a processor to perform a method of any of aspects 10 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
transmitting, to a network entity, control signaling indicating a capability of the UE to apply an amplitude control procedure to one or more antenna elements of a plurality of antenna elements for beamforming, indicating that the UE is applying the amplitude control procedure, and indicating an amount of radiated power loss associated with applying the amplitude control procedure;
receiving, from the network entity, a control message scheduling transmission of an uplink message based at least in part on the capability of the UE to apply the amplitude control procedure and the indicated amount of radiated power loss;
generating, by the UE using the amplitude control procedure, a signal comprising the uplink message for beamformed transmission via the one or more antenna elements of the plurality of antenna elements based at least in part on the amplitude control procedure adjusting one or more amplitudes of the signal for transmission via at least one antenna element of the plurality of antenna elements; and transmitting the signal via the plurality of antenna elements based at least in part on the generating.

2. The method of claim 1,
wherein the amount of radiated power loss is an amount of loss in effective isotropic radiated power, and further comprising:
receiving, from the network entity, one or more downlink transmissions with an applied power boost based at least in part on the indicated amount of radiated power loss.

3. The method of claim 1, wherein transmitting the control signaling further comprises:
transmitting the control signaling comprising a bit field indicating the capability.

4. The method of claim 1, wherein transmitting the control signaling further comprises:
transmitting the control signaling indicating a quantization amplitude adjustment level applied by the amplitude control procedure.

5. The method of claim 1, wherein transmitting the control signaling further comprises:
transmitting the control signaling indicating a quantization amplitude adjustment range applied by the amplitude control procedure.

6. The method of claim 1, wherein transmitting the control signaling further comprises:
transmitting the control signaling indicating which of uniform or non-uniform quantization amplitude adjustment is applied by the amplitude control procedure.

7. The method of claim 1, wherein transmitting the control signaling further comprises:
transmitting control signaling indicating that the capability is a semi-persistent capability indicating that the amplitude control procedure is being applied for a defined time period.

8. The method of claim 1, wherein transmitting the control signaling further comprises:
transmitting the control signaling comprising a request for the network entity to apply a first modulation and coding scheme of a plurality of available modulation and coding schemes for downlink transmission based at least in part on the control signaling indicating that the UE is applying the amplitude control procedure.

9. The method of claim 1, wherein transmitting the control signaling further comprises:
transmitting the control signaling comprising a request for the network entity to apply a power boost for one or more downlink transmissions based at least in part on the control signaling indicating that the UE is applying the amplitude control procedure.

10. A method for wireless communications at a network entity, comprising:
receiving, from a user equipment (UE), control signaling indicating a capability of the UE to apply an amplitude control procedure to one or more antenna elements of a plurality of antenna elements for beamforming indicating that the UE is applying the amplitude control procedure, and indicating an amount of radiated power loss associated with applying the amplitude control procedure;

transmitting, to the UE, a control message scheduling transmission of an uplink message based at least in part on the capability of the UE to apply the amplitude control procedure and the indicated amount of radiated power loss; and monitoring for a signal comprising the uplink message based at least in part on the control signaling and the control message.

11. The method of claim 10,
wherein the amount of radiated power loss is an amount of loss in effective isotropic radiated power, and further comprising:
transmitting, to the UE, the control message comprising an indication to use a lower order modulation and coding scheme for transmitting the uplink message as compared to a second modulation and coding scheme used during transmission of a prior uplink message based at least in part on the indicated amount of radiated power loss; and transmitting, to the UE, one or more downlink transmissions using the lower order modulation and coding scheme or with an applied power boost based at least in part on the indicated amount of radiated power loss.

12. The method of claim 10, wherein the amount of radiated power loss is an amount of loss in effective isotropic radiated power, and further comprising:
transmitting, to the UE, one or more downlink transmissions with an applied power boost based at least in part on the indicated amount of radiated power loss.

13. The method of claim 10, wherein receiving the control signaling further comprises:
receiving the control signaling comprising a bit field indicating the capability.

14. The method of claim 10, wherein receiving the control signaling further comprises:
receiving the control signaling indicating a quantization amplitude adjustment level applied by the amplitude control procedure.

15. The method of claim 10, wherein receiving the control signaling further comprises:
receiving the control signaling indicating a quantization amplitude adjustment range applied by the amplitude control procedure.

16. The method of claim 10, wherein receiving the control signaling further comprises:
receiving the control signaling indicating which of uniform or non-uniform quantization amplitude adjustment is applied by the amplitude control procedure.

17. The method of claim 10, wherein receiving the control signaling further comprises:
receiving the control signaling indicating that the capability is a semi-persistent capability indicating that the amplitude control procedure is being applied for a defined time period.

18. The method of claim 10, wherein receiving the control signaling further comprises:
receiving the control signaling comprising a request for the network entity to use a first modulation and coding scheme of a plurality of available modulation and coding schemes for downlink transmission; and
transmitting a downlink message to the UE in accordance with the first modulation and coding scheme.

19. The method of claim 10, further comprising:
selecting a subset of available modulation and coding schemes for decoding a resource allocated for the uplink message based at least in part on the control signaling indicating that the UE is applying the amplitude control procedure.

20. The method of claim 10, wherein receiving the control signaling further comprises:
receiving the control signaling comprising a request for the network entity to apply a power boost for downlink transmission based at least in part on the control signaling indicating that the UE is applying the amplitude control procedure; and
transmitting a downlink message to the UE with an applied power boost based at least in part on the control signaling.

21. An apparatus for wireless communications at a user equipment (UE), comprising:
a processor;
memory coupled with the processor; and
instructions stored in the memory and executable by the processor to cause the apparatus to:
transmit, to a network entity, control signaling indicating a capability of the UE to apply an amplitude control procedure to one or more antenna elements of a plurality of antenna elements for beamforming, indicating that the UE is applying the amplitude control procedure, and indicating an amount of radiated power loss associated with applying the amplitude control procedure;
receive, from the network entity, a control message scheduling transmission of an uplink message based at least in part on the capability of the UE to apply the amplitude control procedure and the indicated amount of radiated power loss;
generate, by the UE used the amplitude control procedure, a signal comprising the uplink message for beamformed transmission via the one or more antenna elements of the plurality of antenna elements based at least in part on the amplitude control procedure adjusting one or more amplitudes of the signal for transmission via at least one antenna element of the plurality of antenna elements; and
transmit the signal via the plurality of antenna elements.

22. The apparatus of claim 21, wherein
the amount of radiated power loss is an amount of loss in effective isotropic radiated power, and wherein the instructions are further executable by the processor to cause the apparatus to:
receive, from the network entity, one or more downlink transmissions with an applied power boost based at least in part on the indicated amount of radiated power loss.

23. The apparatus of claim 21, wherein the instructions to transmit the control signaling are further executable by the processor to cause the apparatus to:
transmit the control signaling comprising a bit field indicating the capability.

24. The apparatus of claim 21, wherein the instructions to transmit the control signaling are further executable by the processor to cause the apparatus to:
transmit the control signaling indicating a quantization amplitude adjustment level applied by the amplitude control procedure.

25. The apparatus of claim 21, wherein the instructions to transmit the control signaling are further executable by the processor to cause the apparatus to:

transmit the control signaling indicating a quantization amplitude adjustment range applied by the amplitude control procedure.

26. An apparatus for wireless communications at a network entity, comprising:
a processor;
memory coupled with the processor; and
instructions stored in the memory and executable by the processor to cause the apparatus to:
receive, from a user equipment (UE), control signaling indicating a capability of the UE to apply an amplitude control procedure to one or more antenna elements of a plurality of antenna elements for beamforming and indicating that the UE is applying the amplitude control procedure, and indicating an amount of radiated power loss associated with applying the amplitude control procedure;
transmit, to the UE, a control message scheduling transmission of an uplink message based at least in part on the capability of the UE to apply the amplitude control procedure and the indicated amount of radiated power loss; and
monitor for a signal comprising the uplink message based at least in part on the control signaling and the control message.

27. The apparatus of claim 26,
wherein the amount of radiated power loss is an amount of loss in effective isotropic radiated power and wherein the instructions are further executable by the processor to cause the apparatus to:
transmit, to the UE, the control message comprising an indication to use a lower order modulation and coding scheme for transmitting the uplink message as compared to a second modulation and coding scheme used during transmission of a prior uplink message based at least in part on the indicated amount of radiated power loss; and
transmit, to the UE, one or more downlink transmissions using the lower order modulation and coding scheme or with an applied power boost based at least in part on the indicated amount of radiated power loss.

28. The apparatus of claim 26,
wherein the amount of radiated power loss is an amount of loss in effective isotropic radiated power of the signal, and wherein the instructions are further executable by the processor to cause the apparatus to:
transmit, to the UE, one or more downlink transmissions with an applied power boost based at least in part on the indicated amount of radiated power loss.

29. The apparatus of claim 26, wherein the instructions to receive the control signaling are further executable by the processor to cause the apparatus to:
receive the control signaling comprising a bit field indicating the capability.

30. The apparatus of claim 26, wherein the instructions to receive the control signaling are further executable by the processor to cause the apparatus to:
receive the control signaling indicating a quantization amplitude adjustment level applied by the amplitude control procedure.

* * * * *